US012462697B2

(12) United States Patent
Rosenkranz et al.

(10) Patent No.: US 12,462,697 B2
(45) Date of Patent: Nov. 4, 2025

(54) TRAFFIC PATTERN CONTROL OF UAVS AND AUTOMATED DOWNWIND EXTENSIONS

(71) Applicant: Joby Aero, Inc., Santa Cruz, CA (US)

(72) Inventors: Joshua Paul Rosenkranz, San Francisco, CA (US); Craig Richard Milliard, Vallejo, CA (US); Ryan Thomas Olson, San Francisco, CA (US); Maxime Marie Christophe Gariel, San Francisco, CA (US); Adam D. Shelly, Walnut Creek, CA (US); Kelsey McQuikin Bing, Houston, TX (US); Joey Yaozu Zhu, San Francisco, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 241 days.

(21) Appl. No.: 18/097,810

(22) Filed: Jan. 17, 2023

(65) Prior Publication Data
US 2024/0242617 A1     Jul. 18, 2024

(51) Int. Cl.
| | |
|---|---|
| G08G 5/54 | (2025.01) |
| G08G 5/21 | (2025.01) |
| G08G 5/26 | (2025.01) |
| G08G 5/34 | (2025.01) |
| G08G 5/55 | (2025.01) |
| G08G 5/59 | (2025.01) |

(52) U.S. Cl.
CPC ............... *G08G 5/54* (2025.01); *G08G 5/21* (2025.01); *G08G 5/26* (2025.01); *G08G 5/34* (2025.01); *G08G 5/55* (2025.01); *G08G 5/59* (2025.01)

(58) Field of Classification Search
CPC .. G08G 5/0039; G08G 5/0013; G05D 1/0011; G05D 1/2246; G05D 1/0044; G05D 1/22
See application file for complete search history.

(56) References Cited

U.S. PATENT DOCUMENTS

| | | |
|---|---|---|
| 3,035,789 A | 5/1962 | Young |
| 4,022,405 A | 5/1977 | Peterson |

(Continued)

FOREIGN PATENT DOCUMENTS

| | | |
|---|---|---|
| EP | 0945841 A1 | 9/1999 |
| EP | 2698749 A1 | 2/2014 |

(Continued)

OTHER PUBLICATIONS

ASTM International, "Standard Specification for Detect and Avoid System Performance Requirements", ASTM International, May 1, 2020, 22 pages.

(Continued)

*Primary Examiner* — Christian Chace
*Assistant Examiner* — Shayne M. Gilbertson
(74) *Attorney, Agent, or Firm* — Dority & Manning, P.A.

(57) ABSTRACT

Systems and methods for the modification of an aircraft landing pattern through a graphical user interface. The graphical user interface provides buttons associated with flight maneuvers that, when selected, trigger an autopilot of the aircraft to perform the corresponding maneuver. The maneuvers may include a loitering maneuver such as a 360 degree maneuver, a downwind extension maneuver and a turn to base maneuver.

20 Claims, 22 Drawing Sheets

(56) References Cited

U.S. PATENT DOCUMENTS

| | | |
|---|---|---|
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |
| 8,016,226 B1 | 9/2011 | Wood |
| 8,020,804 B2 | 9/2011 | Yoeli |
| 8,078,350 B2 | 12/2011 | Coulmeau |
| 8,311,686 B2 | 11/2012 | Herkes et al. |
| 8,733,690 B2 | 5/2014 | Bevirt et al. |
| 8,737,634 B2 | 5/2014 | Brown et al. |
| 8,849,479 B2 | 9/2014 | Walter |
| 8,897,935 B2 | 11/2014 | Meunier et al. |
| 9,188,978 B2 | 11/2015 | Sacle et al. |
| 9,205,930 B2 | 12/2015 | Yanagawa |
| 9,355,566 B2 | 5/2016 | Garrido-Lopez et al. |
| 9,387,928 B1 | 7/2016 | Gentry et al. |
| 9,410,807 B2 | 8/2016 | Savarit et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,663,237 B2 | 5/2017 | Senkel et al. |
| 9,694,911 B2 | 7/2017 | Bevirt et al. |
| 9,734,724 B2 | 8/2017 | Zammit et al. |
| 9,771,157 B2 | 9/2017 | Gagne et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,838,436 B2 | 12/2017 | Michaels |
| 10,140,873 B2 | 11/2018 | Adler et al. |
| 10,152,894 B2 | 12/2018 | Adler et al. |
| 10,216,190 B2 | 2/2019 | Bostick et al. |
| 10,249,200 B1 | 4/2019 | Grenier et al. |
| 10,302,759 B1 | 5/2019 | Arteaga |
| 10,304,344 B2 | 5/2019 | Moravek et al. |
| 10,330,482 B2 | 6/2019 | Chen et al. |
| 10,593,215 B2 | 3/2020 | Villa |
| 10,593,217 B2 | 3/2020 | Shannon |
| 10,752,365 B2 | 8/2020 | Galzin |
| 10,759,537 B2 | 9/2020 | Moore et al. |
| 10,768,201 B2 | 9/2020 | Luo et al. |
| 10,815,003 B2 * | 10/2020 | Tellechea ................. G08G 5/74 |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2003/0222795 A1 | 12/2003 | Holforty et al. |
| 2009/0125221 A1 | 5/2009 | Estkowski et al. |
| 2009/0259402 A1 | 10/2009 | Gates et al. |
| 2009/0319100 A1 * | 12/2009 | Kale .................. G08G 5/34 |
| | | 701/4 |
| 2010/0079342 A1 | 4/2010 | Smith et al. |
| 2012/0194556 A1 | 8/2012 | Schmitt et al. |
| 2014/0179535 A1 | 6/2014 | Stückl et al. |
| 2016/0311529 A1 | 10/2016 | Brotherton-Ratcliffe et al. |
| 2017/0197710 A1 | 7/2017 | Ma |
| 2017/0357914 A1 | 12/2017 | Tulabandhula et al. |
| 2018/0018887 A1 | 1/2018 | Sharma et al. |
| 2018/0053425 A1 | 2/2018 | Adler et al. |
| 2018/0216988 A1 | 8/2018 | Nance |
| 2018/0308366 A1 | 10/2018 | Goel et al. |
| 2018/0354636 A1 | 12/2018 | Darnell et al. |
| 2019/0012925 A1 | 1/2019 | Barker |
| 2019/0146508 A1 | 5/2019 | Dean et al. |
| 2019/0221127 A1 | 7/2019 | Shannon |
| 2019/0316849 A1 | 10/2019 | Abrego et al. |
| 2019/0381977 A1 | 12/2019 | Kanagarajan et al. |
| 2020/0103922 A1 | 4/2020 | Nonami et al. |
| 2020/0388166 A1 | 12/2020 | Rostamzadeh et al. |
| 2020/0410879 A1 | 12/2020 | Reinquin et al. |

FOREIGN PATENT DOCUMENTS

| | | |
|---|---|---|
| EP | 3499634 A1 | 6/2019 |
| JP | 2010095246 A | 4/2010 |
| JP | 2013086795 A | 5/2013 |
| WO | WO 2018023556 A1 | 2/2018 |
| WO | WO 2019089677 A1 | 5/2019 |
| WO | WO 2020252024 A1 | 12/2020 |

OTHER PUBLICATIONS

Bennaceur et al., "Passenger-centric urban air mobility: Fairness trade-offs and operational efficiency", Transportation Research Part C: Emerging Technologies, 2022, 29 pages.

Jong, "Optimizing cost effectiveness and flexibility of air taxis: A case study for optimization of air taxi operations", University of Twente, Master's thesis, 2007, 62 pages.

Miao et al., "Data-driven robust taxi dispatch under demand uncertainties", IEEE Transactions on Control Systems Technology 27, No. 1, 2017, 16 pages.

Miao et al., "Taxi dispatch with real-time sensing data in metropolitan areas: A receding horizon control approach", In Proceedings of the ACM/IEEE Sixth International Conference on Cyber-Physical Systems, 2015, 15 pages.

Uber, "Fast-forwarding to a future of on-demand urban air transportation", 2016, 99 pages.

* cited by examiner

TRAFFIC PATTERN CONTROL OF UAVS AND AUTOMATED DOWNWIND EXTENSIONS

FIELD

The present disclosure relates to path planning for aircraft.

BACKGROUND

Air traffic (i.e., movement of aircraft) around airports may be orchestrated by air traffic control at controlled airports or left to aircraft pilots at uncontrolled airports. At controlled airports, air traffic controllers may ensure safe and efficient movement of aircraft by providing some limited guidance to pilots while expecting pilots to abide by a set of explicit and/or implicit rules. Example explicit rules may include rules in the Federal Aviation Administration (FAA) Aeronautical Instruction Manual (AIM). Example implicit rules may include those rules that are acquired via pilot training. In the case of uncontrolled airports, in Visual Flight Rules (VFR) conditions, pilots may rely on the above mentioned rules and on their skills to maintain safe separation between aircraft and to maintain a behavior that is predictable by other pilots in the same area.

SUMMARY

The systems and methods described herein provide for the modification of an aircraft landing pattern through a graphical user interface. In some embodiments an aircraft landing pattern control system may comprise a user interface module configured to display a graphical user interface on an operator device. The graphical user interface may further be configured to control an aircraft during a mission while in mission mode.

In some embodiments, the graphical user interface may comprise a visual representation of the aircraft, one or more waypoints, wherein the one or more waypoints include an initial descent waypoint, a base waypoint, a final leg waypoint, and a landing waypoint, and one or more flight legs, wherein the one or more flight legs include a downwind leg, a base leg, and a final leg, wherein the final leg is on a runway heading. The graphical user interface may also include one or more elements configured to display a current state of the aircraft and one or more elements configured to receive set point data from the user. The one or more elements may transmit requests to the aircraft corresponding to the received setpoint data. The graphical user interface may further include one or more flight maneuver buttons. Each of the one or more flight maneuver buttons may correspond to a predefined flight maneuver. In some embodiments, a selection, by the user, of a first flight maneuver button may trigger a request to perform a first predefined flight maneuver. The request may be transmitted to the aircraft.

In some embodiments, the graphical user interface may be in communication with a flight management system operating on the aircraft. The flight management system may be configured to receive a first requests from the user interface module, update the mission based on the received first request, notify a ground control station that the mission has been modified, generate one or more autopilot commands corresponding to the updated mission, and control the aircraft based on the one or more autopilot commands.

In some embodiments, the received first request may correspond to a request to perform the first predefined flight maneuver, and updating of the mission may be based on the first predefined flight maneuver.

In some embodiments, the first flight maneuver button selection may correspond to a downwind extension flight maneuver. The downwind extension flight maneuver may correspond to a flight maneuver whereby the downwind leg is lengthened to provide more spacing between landing aircraft. The user interface module may further be configured to modify the first flight maneuver button to visually indicate a selection and a number of times the first flight maneuver has been performed by the aircraft, move the base waypoint and final leg waypoint to updated positions based on the updated mission, and redraw the downwind leg, base leg, and final leg based on the updated positions of the base waypoint and final leg waypoint.

In some embodiments, updating of the mission may comprise modifying the base waypoint and the final leg waypoint. The modifying may comprise moving the base waypoint and final leg waypoint by a first predetermined distance (Pd) in a direction opposite the runway heading, increasing the final leg waypoint's altitude by the equation tangent (3 degrees)*Pd, up to a predetermined traffic pattern altitude limit, to generate a new final leg waypoint altitude, and increasing the base waypoint's altitude to the new final leg waypoint altitude if the new final leg waypoint altitude is higher. The altitude from the aircraft to the modified base waypoint and from the modified base waypoint to the modified final leg waypoint may be interpolated.

In some embodiments, the first flight maneuver button selection may correspond to a turn-base maneuver. The user interface module may further be configured to modify the first flight maneuver button to visually indicate a selection by the user, move the base waypoint and final leg waypoint to updated positions based on the updated mission, and redraw the downwind leg, base leg, and final leg based on the updated positions of the base waypoint and final leg waypoint.

The updating of the mission may further comprise modifying the base waypoint and the final leg waypoint by moving the base waypoint to a position that is a second predetermined distance in front of the aircraft, to generate a new base waypoint position, and moving the final leg waypoint to a position that is directly across from the new base waypoint position in a direction perpendicular to the runway heading and at an altitude that keeps it on a 3 degree glideslope relative to the final leg waypoint before being moved.

In some embodiments the first flight maneuver button selection may correspond to a 360 degree maneuver. The user interface module may further be configured to modify the first flight maneuver button to visually indicate a selection by the user, display a button configured to generate a request to cancel the 360 degree maneuver, and display a circular flight path corresponding to the 360 degree maneuver.

The updating of the mission may further comprise calculating a first point at a third predetermined distance from the aircraft, wherein the first point is perpendicular to a leg being traveled, and generating a circular flight path centered at the first point, wherein a radius of the circular flight path is determined based on true airspeed of the aircraft and a nominal banking angle.

In some embodiments, updating the mission may comprise adjusting the flight path to perform a climb during the 360 degree maneuver.

In some embodiments, updating the mission may comprise adjusting the flight path to descend a predetermined amount during the 360 degree maneuver.

The features and components of these embodiments will be described in further detail in the description which follows. Additional features and advantages will also be set forth in the description which follows, and in part will be implicit from the description, or may be learned by the practice of the embodiments. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

Figure 1A:
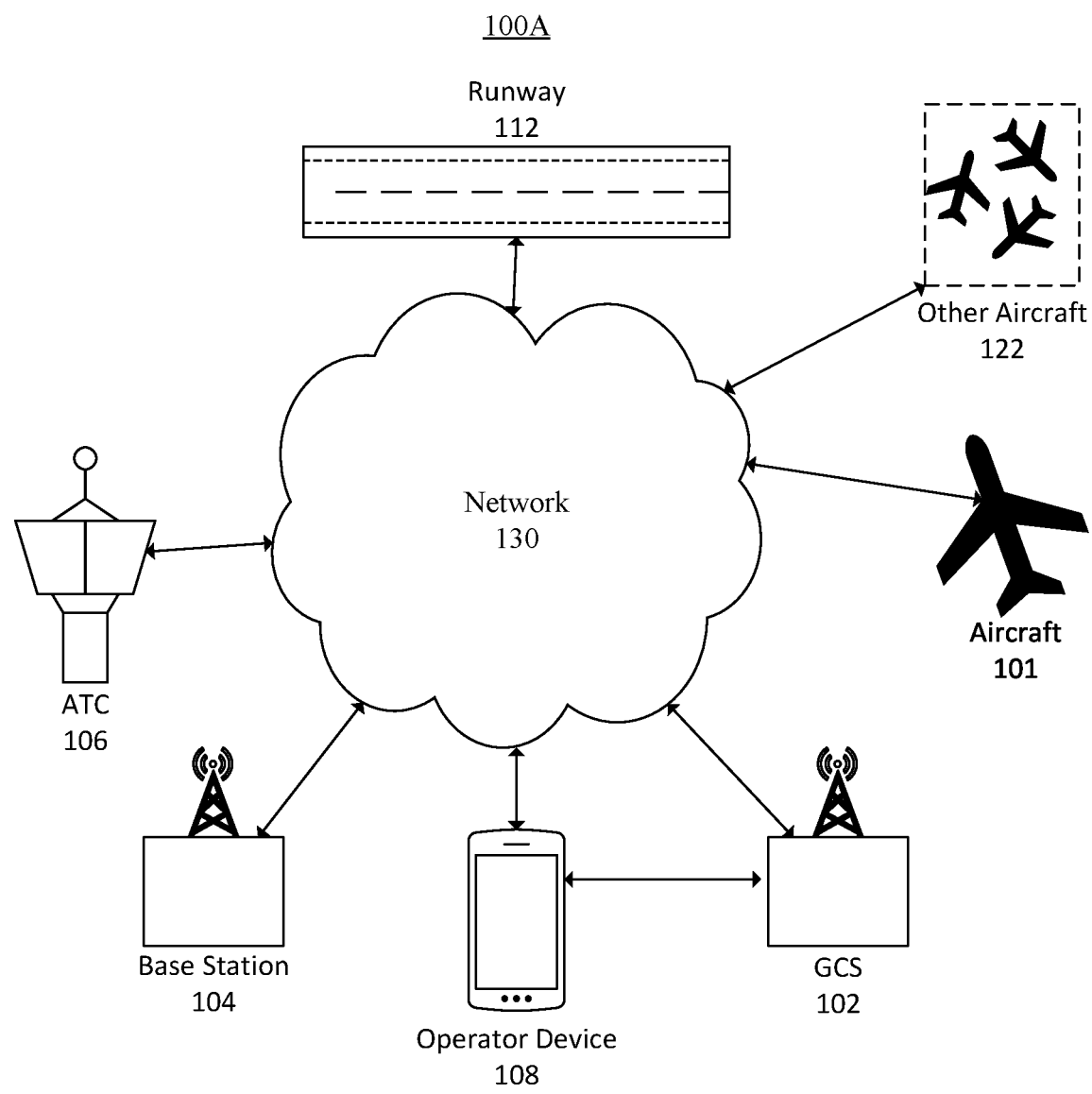
FIG. 1A is an example environment that includes an aircraft that may communicate with a ground control station (GCS), one or more base stations, and one or more air traffic control towers (ATCs) in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

The following generally relates to providing an aircraft pilot with a graphical user interface configured to enable the pilot to easily modify an aircraft autopilots flight plans/paths/patterns or landing patterns through a single click or selection. In some embodiments, the graphical user interface ("UI") may be configured to display one or more single selection operations from which the pilot may select. In some embodiments, there may be UI buttons for extending downwind while the aircraft autopilot is controlling the aircraft to follow a landing pattern. The UI may allow the aircraft pilot to extend downwind an indefinite number of times while the autopilot is controlling the aircraft in the landing pattern. In some embodiments, there may be a UI button configured to "turn base." The selection of the "turn base" button may cause the aircraft to "turn base" before the aircraft reaches a current base leg waypoint (BASE waypoint) of the landing pattern being tracked by the autopilot. In some embodiments, a "left 360" and "right 360" button may be displayed by the UI. Selection of the "left 360" or "right 360" button by the aircraft pilot may result in a right or left 360 degree maneuver being performed by the aircraft. In some embodiments, only one of the "left 360" and "right 360" buttons may be selectable at any point in time. In some embodiments, the 360 button may only be selectable if the aircraft autopilot is engaged in a mission mode and navigating to a normal waypoint. The determination of which 360 button is selectable may be based upon the current heading of the aircraft and the location of a runway in relation to the aircraft (Only the 360 button that turns away from the runway).

In some embodiments, requests from air traffic control (ATC) may be received by the aircraft and relayed to the aircraft pilot and/or a ground control station. These requests may be made over a communication channel and in natural language (verbal requests from a human air traffic controller). In response to the request from ATC, the aircraft pilot may instruct the aircraft to perform a downwind extension, a turn to base, or a 360 degree maneuver. In some embodiments, a natural language processing system may interpret a verbal request from ATC and determine a corresponding flight maneuver to perform based on the request. In some embodiments, the natural language processing system may prompt a pilot of the aircraft to confirm the selection of flight maneuver before the aircraft autopilot begins performing the maneuver.

Figure 1B:
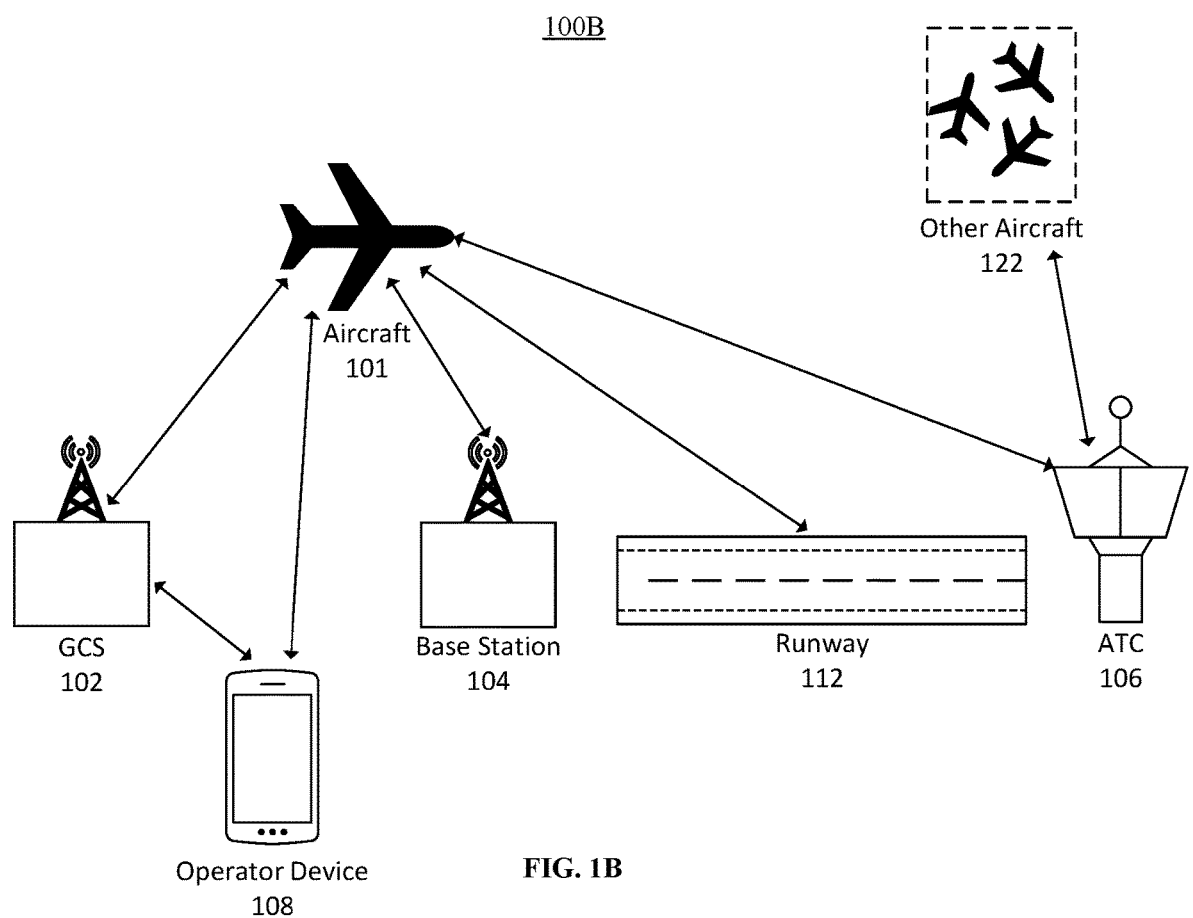
FIG. 1B is an example environment that includes an aircraft that may communicate with a ground control station (GCS), one or more base stations, and one or more air traffic control towers (ATCs) in which some embodiments may operate.

FIGS. 1A and 1B are example environments that includes a runway 112, other aircraft 122, an aircraft 101 that may communicate with a ground control station (GCS) 102, one or more base stations 104, and one or more air traffic control towers (ATCs) 106 in which some embodiments may operate. The aircraft 101 described herein may be a UAV, such as an unmanned cargo aircraft. The aircraft 101 may execute a flight plan and arrive at a destination/arrival airport runway 112.

The aircraft 101 and the GCS 102 may communicate at any time prior to flight, during flight, and after flight. The aircraft 101 and GCS 102 may generate and exchange a variety of types of data, depending on the specific implementation of the aircraft 101 and GCS 102. In some implementations, the aircraft 101 and/or GCS 102 may generate and modify flight plans for execution by the aircraft 101 while in flight between airports. For example, the GCS 102 may generate a flight plan and upload the flight plan to the aircraft 101. In this example, the GCS 102 and/or the aircraft 101 may modify the flight plan during flight.

The GCS 102 and the aircraft 101 may communicate during flight. In some implementations, the GCS 102 may include one or more human remote operators ("operators") that may control and monitor the aircraft 101 during flight through operator device 108. For example, a remote operator in the GCS 102 may send flight commands to the aircraft 101 and receive data from the aircraft 101 and other sources through the operator device 108. Although a GCS 102 using a single operator is described herein, the GCS 102 may include more than one human operator. The human operators may have different roles described herein, such as a remote pilot and flight engineer. For example, a remote operator may be referred to as a remote pilot if the operator meets specific qualifications and performs specific responsibilities. In some implementations, the GCS 102 may also be referred to as an aircraft operations center ("AOC").

Figure 2A:
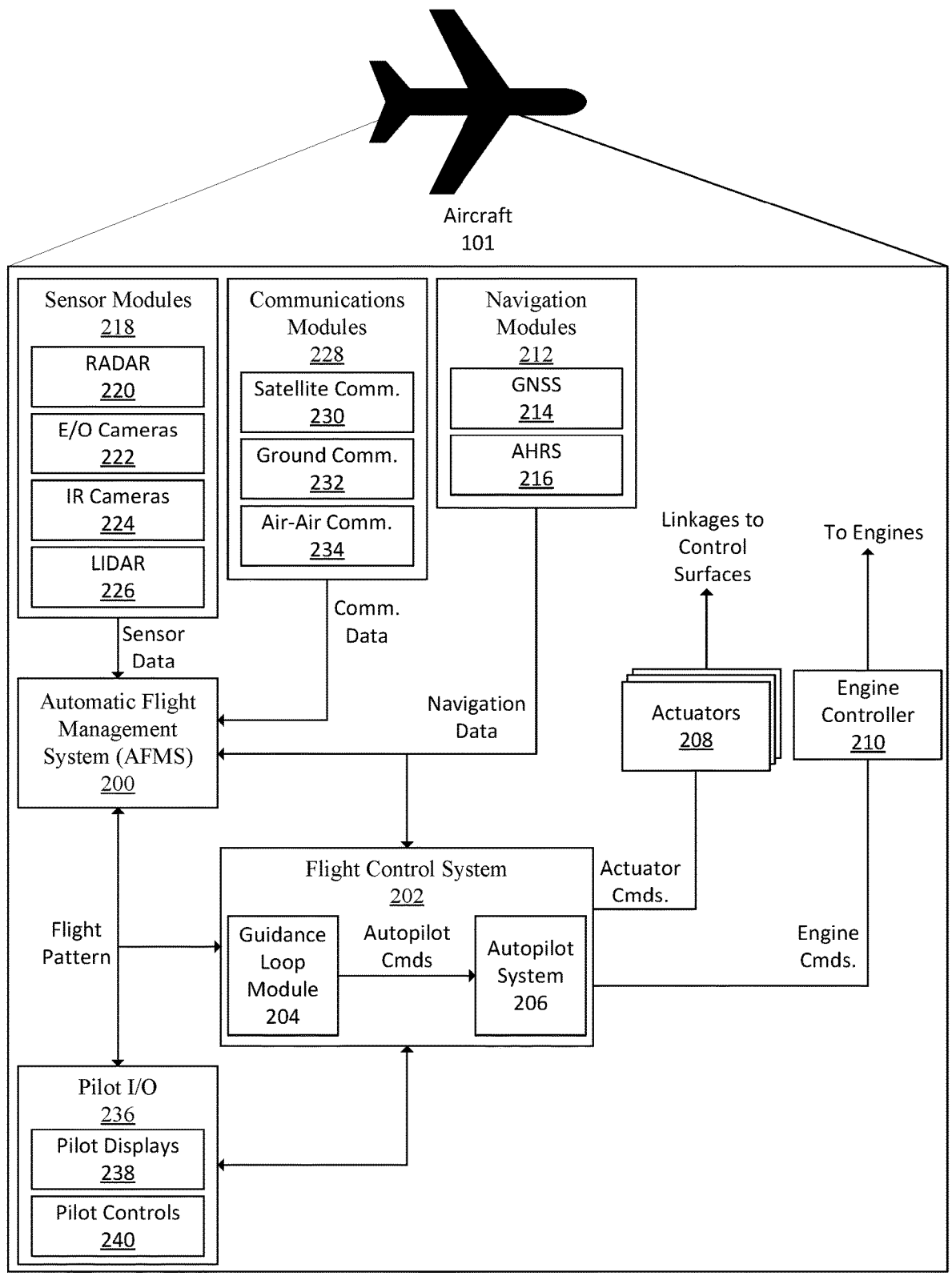
FIG. 2A is a diagram illustrating an exemplary UAV in accordance with aspects of the present disclosure.

FIG. 2A is a functional block diagram of example components included in an aircraft 101 (e.g., an automated flight control system). The aircraft 101 includes the AFMS 200 that generates one or more flight patterns. For example, the AFMS 200 may generate the flight pattern based on navigation data, sensor data, and communication data. The flight control system 202 and/or the pilot(s) may control the aircraft based on the generated one or more flight pattern.

In an autonomous/automated aircraft, the flight control system 202 may operate without human intervention and/or with remote pilot input. In some implementations, the aircraft 101 may include autonomy functions that fully replace the pilot. Some example functions may include contingency management, air traffic control integration, and perception. Contingency management functions may include responses to failure in the aircraft. Additionally, the contingency management functions may include identifying failures, isolating failures, and reconfiguring if possible. Additional functions may include generating an alternate flight plan and contacting emergency services. Example air traffic control integration functions may include communicating with air traffic control services. Example perception functions may include using data from sensors and interpreting the surrounding environment for making decisions based on the data. Additional example functions may include evaluating suitable landing sites.

In some embodiments, the flight control system 202 may be configured to generate one or more downwind extensions for a flight pattern. The one or more downwind extensions may be generated in response to input from a pilot. In some embodiments, one or more 360 degree patterns may be planned and performed in response to pilot input. The pilot input may be received through a user interface displayed on the operator device 108.

The AFMS 200 generates the one or more flight patterns for the flight control system 202 and/or pilot. For example, the AFMS 200 may generate a landing pattern, takeoff pattern, and/or other flight patterns. The flight control system 202 can control the aircraft 101 according to the flight pattern along with other data. In some implementations, the flight pattern may be output to a pilot interface (e.g., a display, such as a flight director display) or user interface displayed on operator device 108.

The flight control system 202 includes a guidance loop module 204 and an autopilot system 206. The guidance loop module 204 may receive the landing pattern. The guidance loop module 204 may also receive additional information regarding the state of the aircraft 101, such as a current location (e.g., a latitude/longitude/altitude), velocity, and aircraft attitude information. Based on the received information, the guidance loop module 204 may generate autopilot commands. Example autopilot commands may include, but are not limited to, a heading command, an airspeed command, an altitude command, and a roll command.

The autopilot system 206 may be configured to control the aircraft 101 based on the received autopilot commands. For example, the autopilot system 206 may output control signals/commands that control various actuators 208 and engines on the aircraft 101. In a specific example, the output of the autopilot system may include actuator position commands and engine thrust commands. The autopilot system 206 may control a variety of aircraft parameters, such as heading, airspeed, altitude, vertical speed, roll and pitch of the aircraft.

The aircraft 101 may include a plurality of control surfaces. Example control surfaces may include, but are not limited to, ailerons, tabs, flaps, rudders, elevators, stabilizers, spoilers, elerudders, ruddervators, flaperons, landing gears, and brakes for fixed-wing aircraft. Rotorcraft may include other controls/surfaces (e.g., rotor collective, cyclic, and tail rotor). The aircraft 101 can include actuators/linkages that control the control surfaces based on the commands generated by the autopilot system 206. The actuators and linkages may vary, depending on the type of aircraft.

The aircraft 101 may include an engine controller 210 that controls one or more aircraft engines. The engine controller 210 may control the engine(s) based on the received engine commands, such as thrust commands that indicate an amount of thrust. For example, the engine controller 210 may control fuel and other engine parameters to control the engines according to the received engine commands. In some implementations, the engine controller 210 may include a full authority digital engine control (FADEC) that controls the engines. Although the engine controller 210 is illustrated as separate from the autopilot system 206, in some implementations, the engine controller 210 can be integrated into the autopilot system 206. Example engines may include, but are not limited to, a piston engine, turboprop, turbofan, turbojet, jet, and turboshaft. In some implementations, the aircraft 101 may include one or more electric motors. In some implementations, the aircraft 101 may include a propeller system. In these implementations, a lever may control the pitch/RPM of the propeller.

The aircraft 101 may include a navigation system 212 that generates navigation data. The navigation data may indicate the location, altitude, velocity, heading, and attitude of the aircraft 101. The navigation system 212 may include a Global Navigation Satellite System (GNSS) receiver 214 that indicates the latitude and longitude of the aircraft 101. The navigation system 212 may also include an attitude and heading reference system (AHRS) 216 that may provide attitude and heading data for the aircraft, including roll, pitch, and yaw. The navigation system 212 may include an air data system that may provide airspeed, angle of attack, sideslip angle, altitude, and altitude rate information. The navigation system 202 may also include a radar altimeter and/or a laser altimeter to provide Above Ground Level (AGL) altitude information.

The aircraft 101 may include a plurality of sensor modules 218 that generate sensor data. For example, the aircraft 101 may include one or more radar systems 220, one or more electro-optical (E/O) cameras 222, one or more infrared (IR) cameras 224, and/or light detection and ranging systems (Lidar) 226. The Lidar systems 226 may measure distance to a target by illuminating the target with laser light and measuring the reflected light with a sensor. The radar systems 220 and cameras 222, 224 may detect other aircraft. Additionally, the sensor modules 218 (e.g., Lidar and cameras) may determine whether the runway is clear when approaching for a landing. In some implementations, potential obstacles (e.g., surrounding air traffic and weather) may be identified and tracked using at least one of, onboard and offboard radar, cameras, Automatic Dependent System-Broadcast (ADS-B), Mode C transponder, Mode S transponder, Traffic Collision Avoidance System (TCAS), Traffic Information Service-Broadcast (TIS-B), Flight Information Service-Broadcast (FIS-B), and similar services. The data from these sensors and services may be fused and analyzed to understand and predict the behavior of other aircraft in the air or on the ground.

In some implementations, the AFMS 200 may determine tracking data for surrounding aircraft. Tracking data for an aircraft may indicate the location, heading, and speed of the aircraft. In some implementations, the AFMS 200 may determine traffic classification data for each aircraft (e.g., see FIGS. 8A-8B). Example traffic classification data may indicate a leg (e.g., downwind, final, etc.) the aircraft is on and what runway the aircraft is using to land. Although the AFMS 200 (e.g., traffic classifier module 256) is illustrated and described herein as determining tracking data and traffic classification data, in some implementations, other systems/modules (e.g., a traffic classifier system) may determine the tracking data and the traffic classification data. In these implementations, the AFMS 200 may use the traffic classification data in the manner described herein, such as for runway-pattern selection and pattern planning.

The aircraft 101 may include one or more communication systems 228 described herein. For example, the aircraft 101 may include one or more satellite communication systems 230, one or more ground communication systems 232, and one or more air-to-air communication systems 234. The communication systems 228 may operate on a variety of different frequencies. In some implementations, the communication systems 228 may form data links. In some implementations, the communication systems 228 may transmit the flight pattern to an aircraft operations center 106 and/or to ATC 104. The communication systems 228 may gather a variety of information, such as traffic information (e.g., location and velocity of aircraft), weather information (e.g., wind speed and direction), and notifications about airport/runway closures. In some implementations, a voice connection (e.g., ATC communication over radio VHF) may be converted to text for processing. In some implementations, the aircraft 101 can broadcast their own position and velocity (e.g., to the ground or other aircraft).

The aircraft 101 may include a pilot interface that may include pilot input/output devices 236. For example, the pilot interface may include one or more displays 238. In some implementations, the flight pattern may be displayed on a pilot display 238 (e.g., on a flight director display or on the operator device 108) for the pilot's reference. The pilot interface may also include pilot controls 240, such as a flight yoke and manual buttons/switches. In some implementations, the pilot interface may include speakers, headphones, and/or microphones for radio communication.

The AFMS 200 may compute a flight pattern at a variety of different times. In some implementations, the AFMS 200 may compute a landing pattern before takeoff and/or while en route to the airport. For example, the AFMS 200 may calculate the landing pattern when the aircraft is within a predetermined time and/or distance from the runway 102. In this example, the AFMS 200 may be configured to automatically calculate the landing pattern. In some implementations, the AFMS 200 may be manually instructed by the pilot to calculate the landing pattern (e.g., via input on pilot controls 240 and/or displays 238).

The AFMS 200 may also be configured to automatically recompute the flight pattern in response to triggers, such as the appearance of obstacles in the flight path, the appearance of aircraft in the airspace, updates from ATC 104, runway availability, weather, and aircraft failures or contingencies. Additional triggers may include loss of command and control links, control actuator failures, sensor failures, aircraft damage, and/or temporary flight restrictions.

Figure 2B:
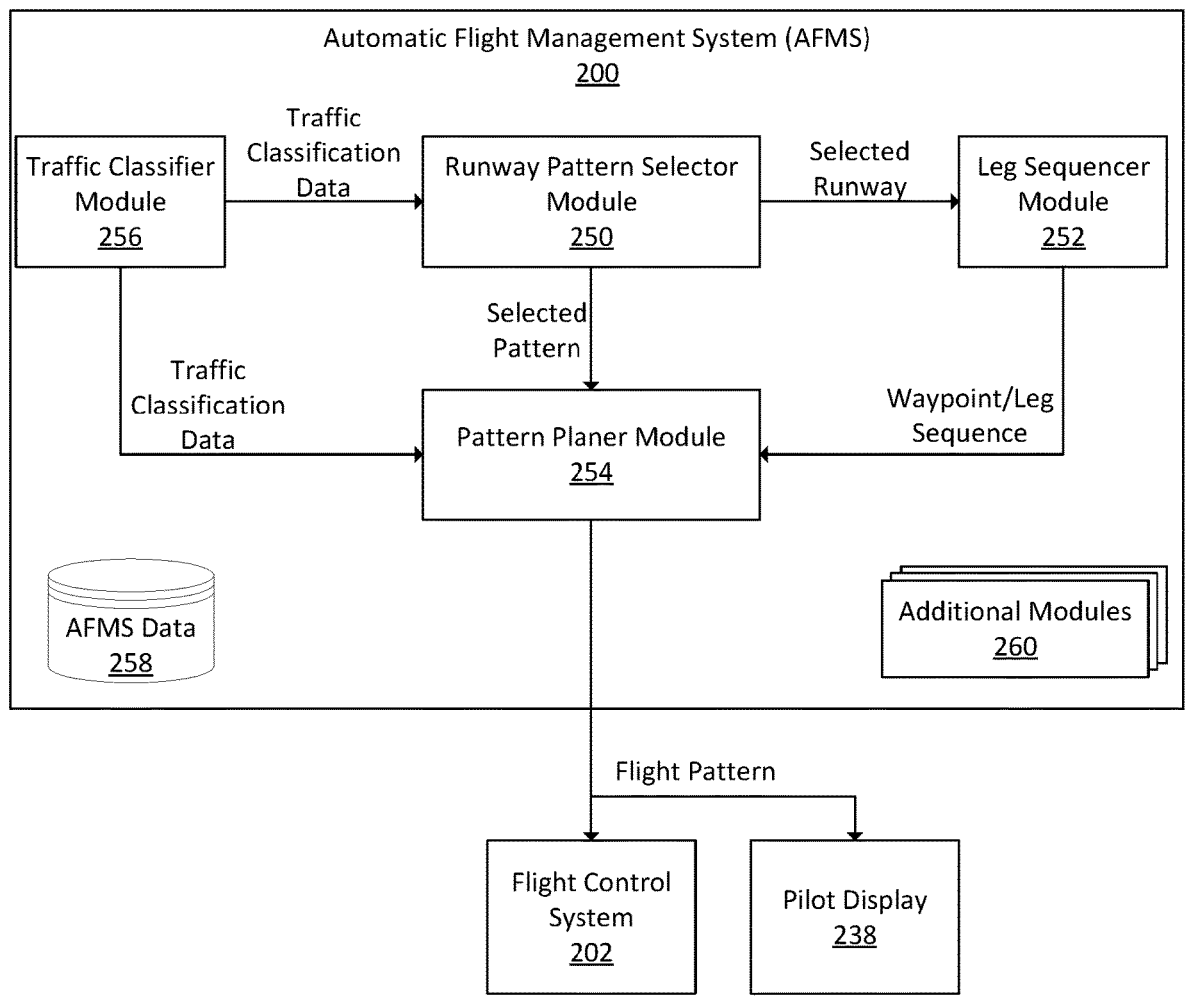
FIG. 2B is a diagram illustrating an exemplary automatic flight management system (AFMS) in accordance with aspects of the present disclosure.

FIG. 2B illustrates an example AFMS 200 that generates a flight pattern. The AFMS 200 may include a runway-pattern selector module 250, a leg sequencer module 252, a pattern planner module 254, and a traffic classifier module 256. The runway-pattern selector module 250 may select a runway and a left or right traffic pattern (e.g., for landing). The leg sequencer module 252 may select a starting waypoint for the flight pattern. The leg sequencer module 252 may also select a sequence of additional waypoints/legs to follow after the starting waypoint.

The pattern planner module 254 may generate the flight pattern based on the selected runway, selected left/right pattern, and the selected waypoint/leg sequence. For example, the pattern planner module 254 may generate constraint equations for each waypoint, generate an objective function for maximizing/minimizing various quantities (e.g., altitude, speed, and/or timing), and then solve the objective function to determine the waypoint variable values (e.g., waypoint locations).

In some embodiments, the pattern planner module 254 may generate an objective function for optimizing various flight parameters, such as location values, timing values, speed values, and/or fuel values. The pattern planner module 254 may solve the objective function subject to the constraint equations. The solution generated by the pattern planner module 254 may include values for the variables associated with the waypoints. For example, the solution may include latitude values, longitude values, and altitude values associated with the waypoints. In some embodiments, the solution may include X, Y, Z coordinate values relative to the runway. The pattern planner module 254 may transform the X, Y, Z coordinate values to global latitude and longitude coordinates based on the latitude, longitude, and altitude of the runway, along with the runway direction. In some embodiments, the solution may include values for speed variables, timing variables, or other variables associated with the waypoint/leg sequence determined by leg sequencer module 252.

The pattern planner module 254 may generate the flight pattern (e.g., the landing pattern) based on the solution to the objective function. For example, the pattern planner module 254 may generate a landing pattern that includes the sequence of waypoints and associated three dimensional locations of the waypoints.

The traffic classifier module 256 may detect, track, and classify surrounding traffic as well as predict their behavior. The traffic classifier module 256 may receive data that includes ADS-B data, TIS-B data, TCAS data, Mode C data, Mode S data, camera data, Lidar data, radar data, and other traffic data. The traffic classifier module 256 may output traffic classification data that includes tracking data that indicates a location and direction of other aircraft, along with additional data that characterizes the other aircraft, such as the other aircraft's predicted runway and current leg. Traffic classification data can be used to select the runway, pattern plan, and to avoid other aircraft.

The AFMS 200 may include AFMS data 258 that may be used by modules included in the AFMS 200. In some implementations, the AFMS data 258 may be stored prior to takeoff. Additionally, or alternatively, the AFMS 200 may receive data from other systems/modules that the AFMS 200 may use to generate the flight pattern. Example AFMS data 256 may include sensor data, communication data, navigation data, and traffic classification data. Example AFMS data described herein may also be stored on other aircraft devices and provided to the AFMS 200.

The AFMS 200 may include additional modules 260, such as an ATC manager module 260-1 and a weather manager module 260-2. The ATC manager module 260-1 may acquire ATC information. For example, the ATC manager module 260-1 may interact with and request clearances from ATC 104 via VHF, satellite, or a data connection (e.g., the Internet). ATC traffic information may provide guidance and/or clearances for various operations in controlled airspace. The information from ATC may come from a radio using speech-to-text recognition or a digital data-link, such as Controller Pilot Data Link Communications (CPDLC) or from the Unmanned Traffic Management (UTM) System.

The weather manager module 260-2 may acquire the current and future weather information in the vicinity of the destination airport as well as any other source for weather in between the current location and the destination airport. The weather information can be provided via satellite, Internet, VHF, onboard weather radar, and Flight Information Services-Broadcast (FIS-B). The information from these and other sources may be fused to provide a unified representation of wind, precipitation, visibility, etc.

The AFMS 200 may include additional planning modules for en route planning, taxiing, and/or holding. The AFMS 200 may also include modules for vehicle management, such as optimizing fuel and trajectory based on the performance of the aircraft. In some implementations, the AFMS 200 may include a detect-and-avoid module to safely detect and avoid surrounding traffic. In some implementations, the AFMS 200 may also include a contingency/emergency management module.

Figure 2C:
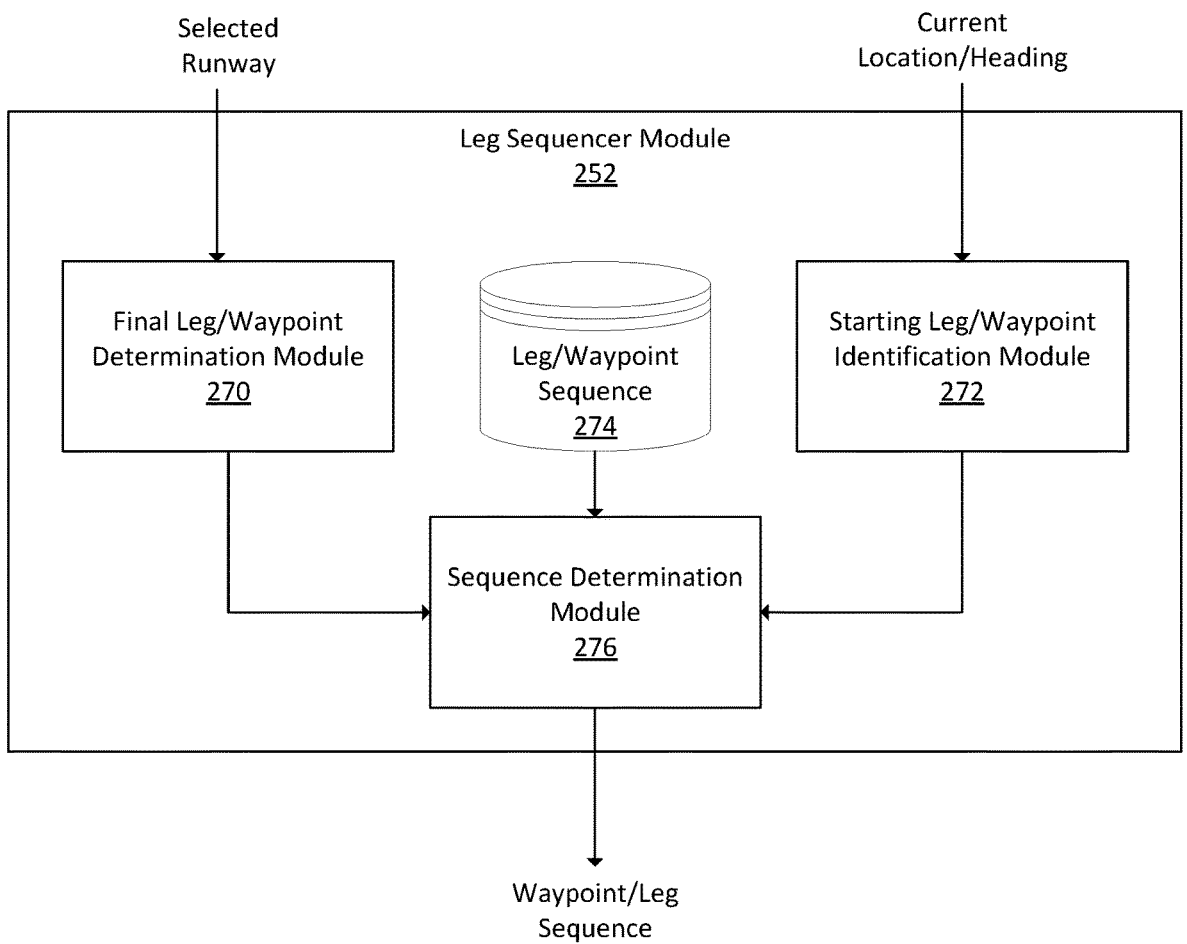
FIG. 2C is a diagram illustrating an exemplary leg sequencer operating in the AFMS in accordance with aspects of the present disclosure.

FIG. 2C is a diagram illustrating an exemplary leg sequencer module 252 operating in the AFMS 200 in accordance with aspects of the present disclosure. Leg sequencer module 252 may comprise final leg/waypoint determination module 270, starting leg/waypoint identification module 272, leg/waypoint sequence 274, and sequence determination module 276.

The final leg/waypoint determination module 270 may determine the final leg/waypoint of the flight pattern. For landing patterns, the final leg/waypoint determination module 270 may use a landing waypoint (LAND) waypoint for the selected runway. The starting leg/waypoint identification module 272 (hereinafter "starting waypoint module 272") may be configured to determine the current location and heading of the aircraft. The starting waypoint module 272 may be configured to select the starting waypoint. For example, the starting waypoint module 272 may determine the starting waypoint based on at least one of aircraft location (e.g., aircraft latitude/longitude) and aircraft heading. In some implementations, the starting waypoint module 272 may determine the starting waypoint based on additional data, such as aircraft altitude, aircraft speed, and/or traffic classification data.

Starting waypoint selection criteria may include aircraft location and heading. In some implementations, the starting waypoint module 272 may select a starting waypoint when both the location of the aircraft and the heading of the aircraft match the starting waypoint criteria. In some implementations, the starting waypoint module 272 may default to a starting waypoint, such as APPR, if other waypoints are not sufficient according to the starting waypoint criteria.

In some implementations, the starting waypoint module 272 may select the starting waypoint based on traffic classification data. For example, the starting waypoint module 272 may select the starting waypoint based on whether air traffic is present in the vicinity of the airport and/or the amount of air traffic (e.g., the number of aircraft in the vicinity of the airport). If multiple additional aircraft are present, the starting waypoint module 272 may select/reject a waypoint based on whether the aircraft can insert itself in between other additional aircraft while maintaining an appropriate distance. In some implementations, ATC 104 can provide instructions that can assist in selecting the starting waypoint. In some implementations, the pilot may manually select the starting waypoint based on visuals, instruments, and/or ATC instructions. As described herein, in some implementations, the starting waypoint module 272 may select the starting waypoint based on the amount of traffic in the vicinity of the airport. For example, the starting waypoint module 272 may select the starting waypoint as the approach waypoint (APPR) in cases where there is greater than a threshold amount of traffic in the vicinity of the airport (e.g., greater than a threshold number of aircraft).

The sequence determination module 276 may be configured to determine the sequence of waypoints for the flight pattern based on the starting waypoint and the final leg/waypoint. For example, the sequence determination module 276 may determine the waypoint sequence by traversing the waypoint sequence from the starting waypoint to the final waypoint. In the case of a landing pattern, the sequence determination module 276 may determine the waypoint sequence starting with the starting waypoint and traversing the waypoint sequence until the LAND waypoint. Although the waypoint sequence is directed to generating a landing pattern, other waypoint sequences may be generated for other flight patterns. The sequence determination module 276 may output the waypoint/leg sequence.

Figure 2D:
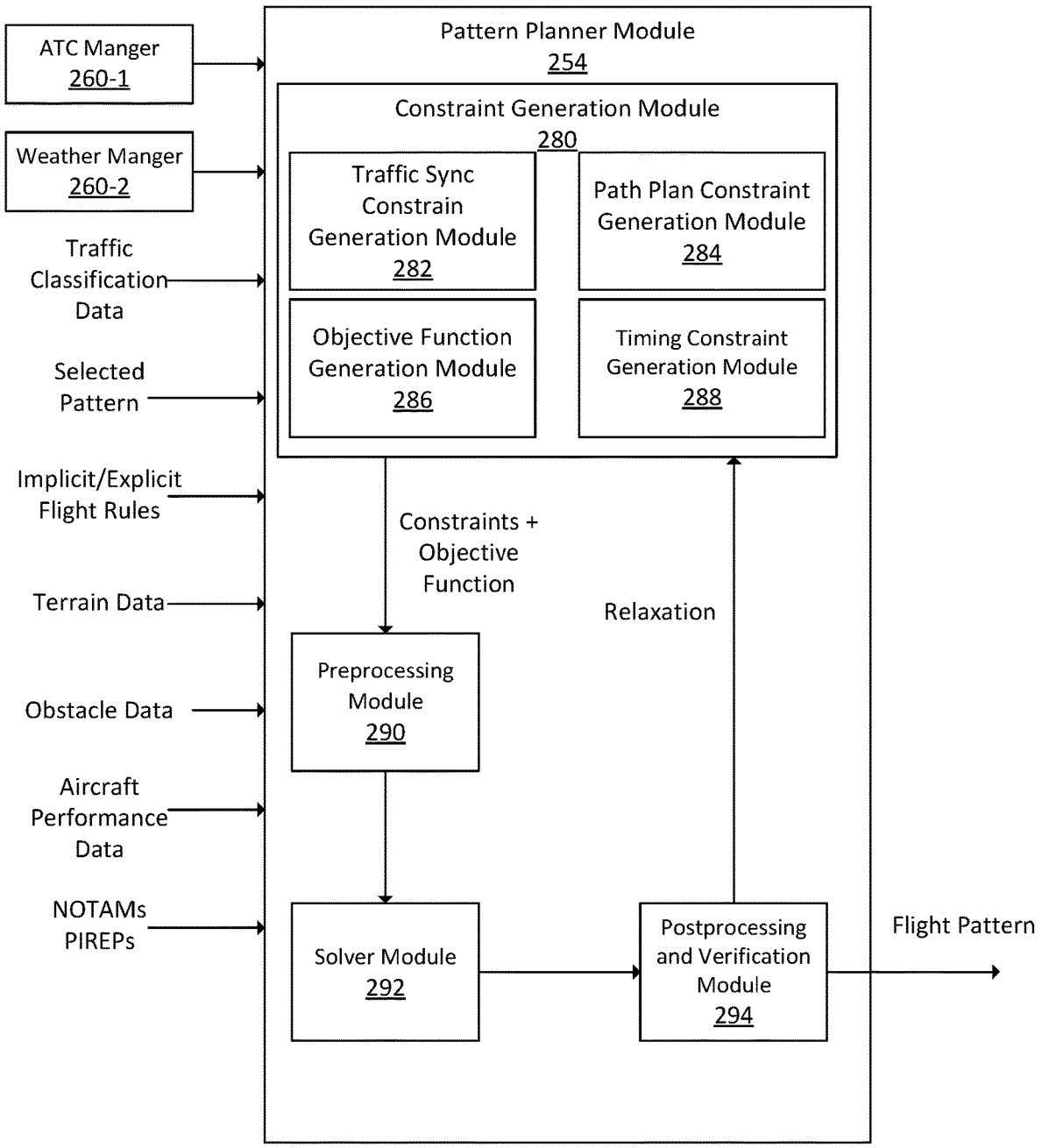
FIG. 2D is a diagram illustrating an exemplary pattern planner operating in the AFMS in accordance with aspects of the present disclosure.

FIG. 2D is a diagram illustrating an exemplary pattern planner module 254 operating in the AFMS 200 in accordance with aspects of the present disclosure. The pattern planner module 254 may comprise a constraint generation module 280, preprocessing module 290, solver module 292, and postprocessing and verification module 294. The constraint generation module 280 may further comprise traffic sync constraint generation module 282, path plan constraint generation module 284, objective function generation module 286, and timing constraint generation module 288.

The pattern planner module 254 may be configured to generate the flight pattern based on the selected runway, waypoint/leg sequence, traffic classification, and additional data. Example additional data may include ATC information, weather information, implicit/explicit flight rules, terrain and obstacle data, aircraft performance data, airspace restrictions, Notices to Airmen (NOTAMs), and pilot reports (PIREPs). Implicit and explicit flight rules may be derived from the Federal Aviation Regulations (FARs), the Aeronautical Information Manual (AIM), and collective pilot experience. This information may define how pilots are expected to fly their aircraft in the proximity of other aircraft and how they should interact with ATC 104.

Example terrain and obstacle data may include geometric descriptions of terrain (e.g., hills/mountains) and obstacles including geolocation and elevation. Example aircraft performance data may include aircraft (e.g., autonomous aircraft) specifications that define the maneuvers that the aircraft is capable of performing (e.g., maximum climb rate, descent rate, stall speed, etc.). Airspace restrictions, NOTAMs, PIREPs and other information may be published by the FAA and can be retrieved via an onboard internet connection. This may provide important information regarding current conditions, temporary obstacles, airspace restrictions, runway closures, etc.

The pattern planner module 254 may use data described herein with respect to FIG. 2D, along with other data, to generate constraints and objectives that are the inputs to an optimization problem. A path planning optimizer may solve the optimization problem, thereby generating a flight pattern that is dynamically feasible, safe, and that satisfies airspace, weather, traffic, and other constraints.

A flight pattern may be defined as a sequence of waypoints (e.g., physical locations in 3D space, such as GPS coordinates) or as a sequence of legs (e.g., straight lines in 3D space). A straight line connecting two waypoints may be referred to as a leg, each of which has the name of the waypoint located at its beginning (in the direction of flight). The optimization problem described herein may be equivalent using waypoints or legs. Waypoints are used herein. Waypoints may additionally include information, such as desired airspeed, ground speed, time of arrival, or other parameters described herein. The flight control system 202 may be configured to accept the sequence of waypoints as inputs and command the aircraft 101 such that the aircraft's trajectory passes through the waypoints and its airspeed, ground speed, time of arrival, and other parameters at the waypoint matches those requested parameters.

In some embodiments, the pattern planner module 254 may be configured to generate a pattern that tracks a circle of a given radius around a specified point. In some embodiments, when a left or right 360 maneuver button in a user interface is clicked, by an aircraft pilot, a point may be computed that is one radius away from the autopilot, in a direction perpendicular to the current waypoint segment track. The autopilot system 206 may track a circle with a given radius around that point.

In some embodiments, the autopilot may control the aircraft to perform a climb through the 360 degree maneuver or continue a descent through the 360 degree maneuver. After completing the 360 degree maneuver, the aircraft may automatically return to the flight pattern. In some embodiments, the aircraft pilot may choose to cancel the 360 degree maneuver and resume flying the traffic pattern.

The radius of the 360 degree maneuver may be determined by a new autopilot parameter. The chosen parameter may be set based on a nominal bank angle during the 360 degree maneuver if no wind was present. In some embodiments, the nominal bank angle of 360 degree maneuver may be between 20 and 30 degrees under no wind conditions.

This may then be mapped to a radius using the following equation:

$$\text{radius} = v^2/(g^* \tan(\text{roll}))$$

where v is the true airspeed, not the groundspeed, to represent the zero-wind nominal case.

The default value for this parameter may be dictated by the worst case wind the aircraft is expected to encounter and the radius that would allow the aircraft to not exceed a bank angle limit of 30 deg. In some embodiments, the default bank angle may be increased at the expense of not being able to track the circle exactly. In a worst case scenario, the wind may be blowing at 30 kts directly across the runway such that there is a tailwind for the last 90 degrees of the 360 turn. In this case:

$$v = \text{airspeed} + 30 \text{ kts} =$$
$$110 \text{ kts (max speed on downwind)} + 30 \text{ kts} = 140 \text{ kts} = 72.02 \text{ m/s}$$
$$\text{roll} = 30 \text{ deg (bank angle limit)}$$
$$g = 9.81 \text{ m/s}^2$$
$$\text{radius} = v^2/(g*\tan(\text{roll})) = 72.02^2/(9.81*\tan(30 \text{ deg})) = 915.8 \text{ m}$$

The roll angle that corresponds to this radius in the no-wind case is $$\text{roll} = \text{atan}(v^2/(g*\text{radius})) = \text{atan}(56.6^2/(9.81*915.8)) = 19.6 \text{ deg}.$$

For simplicity's sake (and because this angle assumes a constant 30 kt tailwind even as the aircraft is changing heading), the default value may be rounded to 20 degrees.

If the aircraft is in a CLIMB mode (climbing), the altitude setpoint may not change, and the climb may be allowed continue during the 360 maneuver. Otherwise, the altitude setpoint at the moment the 360 maneuver button was clicked by the aircraft pilot may be the altitude setpoint throughout the 360. Once the 360 is complete, the altitude logic may proceed as if the 360 degree maneuver never occurred. The same may be done with the airspeed setpoint.

A flag may be added to the autopilot indicating that a special 360 logic is active. If the flight mode changes and is no longer in mission mode, this flag may be reset. If the aircraft pilot clicks a button to cancel the 360 degree maneuver, this flag may be reset. This flag may also reset when the 360 degree maneuver is complete, and the aircraft may then go back to flying between waypoints as normal. The autopilot may use the following logic to determine if the 360 degree maneuver has been completed:

if abs(aircraft_groundtrack − waypoint_segment_track >

175 deg_can_complete_360 = true if abs(aircraft_groundtrack − waypoint_segment_track) < 45 deg &&

_can_complete_360_completed_360 = true

The autopilot may switch back to normal waypoint navigation when the aircraft groundtrack is less than 45 deg offset from the waypoint segment track, but only if the aircraft groundtrack previously differed by more than 175 deg (to ensure the autopilot does not immediately declare the 360 complete the moment it starts because the groundtrack is lined up with the waypoint segment track).

In some embodiments, the logic may be implemented in a state machine with the following states: NONE, LEFT, RIGHT, CAN_EXIT_LEFT, and CAN_EXIT_RIGHT.

In some embodiments, when the maneuver is initiated, the state switches from NONE to LEFT or RIGHT (depending on the direction). Once the aircraft is 175 deg offset from the waypoint segment track, the state can then transition the LEFT/RIGHT state to a CAN_EXIT_LEFT/CAN_EXIT_RIGHT. Once the aircraft is aligned within 45 deg of the waypoint segment track state may then transition back to NONE.

In some embodiments, the pattern planner module 254 may be configured to generate a pattern that moves the current BASE waypoint and the approach/final leg waypoint to points further away from the aircraft than the current position of the said waypoints. In some embodiments, when a "Extend Downwind" button in a user interface is clicked by an aircraft pilot, the waypoints may be moved in a direction opposite the runway heading. The downwind extension may be used to provide the aircraft pilot more time to re-assess the current situation of the aircraft and extend the downwind leg further if needed.

In some embodiments, the waypoints may be moved a predetermined distance, for example 0.5 miles, from their current position so that the current path of the aircraft is extended. In some embodiments, the distance that the waypoints are to be moved may be based on type or model of the aircraft and/or characteristics of the airspace. In some embodiments, the distance may be determined based at least partly on duration of time parameter. The duration of time parameter may be predetermined or selectable by the aircraft pilot. Since different aircrafts have different airspeed characteristics, the distance traveled during that duration of time vary from aircraft to aircraft, and the positioning of the waypoints may be determined such that they will be reached at the desired time. In some embodiments, the distance may be lengthened or shortened based the characteristics of the airspace, such as positions of hazards, other aircraft, and restricted airspaces. For example, if the determined distance would result in crossing over a restricted airspace or put the aircraft unreasonably close to a hazard, the distance may be shortened. In another example, if the distance the waypoints would be moved result in the base leg crossing or intersecting with a restricted airspace or hazard, the distance may be lengthened, such that the base leg would no longer cross or intersect the restricted airspace or hazard. The new position of the BASE waypoint may be determined so that no course adjustments need to be made to reach the waypoint (straight line).

In some embodiments, the altitude of the approach/final leg waypoint may be increased by tan(3 degrees)*0.5 miles so it continues to be on a 3 deg glidepath (glideslope) above the landing waypoint (LAND waypoint 315 in FIGS. 3A-D) up to a limit of 1000 ft AGL (traffic pattern altitude). The altitude of the base waypoint may stay the same (unless the approach/final leg waypoint is higher, in which case it may be set to the approach waypoint altitude). In some embodiments, the base waypoint may also be modified to specify that the altitude to the base waypoint should be interpolated instead of specifying a 3 degree glidepath.

In some embodiments, the aircraft pilot may instruct the aircraft to perform more than one downwind extension maneuver by clicking the "Extend Downwind" button for each additional downwind extension desired. In some embodiments, once the "Extend Downwind" button is clicked, the autopilot or user interface may confirm the request to extend downwind through a prompt to the autopilot. When confirmed, the text on the button may turn green and read "Extending Downwind (1×)". Each successive time downwind is extended, the "1×" may change to "2×", then "3×", etc. Once the original base waypoint is passed, the "Turn Base" button may be changed from being greyed out (unclickable) to being clickable. In some embodiments, the "Extend Downwind" button may only be selectable if the autopilot is engaged in mission mode, navigating to a normal waypoint, on the downwind leg of the traffic pattern (see FIGS. 3A-3D downwind leg 306). The button may be greyed out otherwise.

In some embodiments, the altitude between each of the waypoints in the modified flight plan may be interpolated instead of specifying a certain glidepath angle. This may ensure that the autopilot never levels out or dives to the glidepath angle regardless of where it is when the "Extend Downwind" button is pressed. This may also make the flight plan more robust to changes in pattern size.

Below are example outcomes of a single downwind extension when the downwind extension is requested before a midfield downwind point, depending on where the aircraft pilot requests a turn to base. These numbers assume the current pattern size.

EXAMPLE 1

If extension is max (½ mile=2640 ft):
Downwind glidepath goes from 3.0 degree to 1.3 degree
BASE waypoint altitude remains unchanged at 692.94 ft
BASE leg glidepath goes from 3.0 degree to 1.4 degree Approach/final leg waypoint altitude goes from 433.80 ft to 572.16 ft
Approach/final leg length goes from 7881.2 ft to 10521.2 ft

EXAMPLE 2

If extension is min (0 ft):
Downwind glidepath goes from 3.0 degrees to 1.3 degrees
BASE waypoint altitude goes from 692.94 ft to 751.93 ft
BASE leg glidepath goes from 3.0 degrees to 3.7 degrees
Approach/final leg waypoint altitude is unchanged at 433.80 ft
Approach/final leg length is unchanged at 7881.2 ft

EXAMPLE 3

If extension is nominal (¼ mile=1320 ft):
Downwind glidepath goes from 3.0 degrees to 1.3 degrees
BASE waypoint altitude goes from 692.94 ft to 722.43 ft
BASE leg glidepath goes from 3.0 degrees to 2.6 degrees
Approach/final leg waypoint altitude goes from 433.80 ft to 502.98 ft
Approach/final leg length goes from 7881.2 ft to 9201.2 ft
If the downwind extension is instead requested at the top of descent point on the downwind leg (see FIGS. 3A-D INIT waypoint 312), the below outcomes may be determined.

EXAMPLE 4

If extension is max (½ mile=2640 ft):
Downwind glidepath goes from 3.0 degrees to 1.4 degrees
BASE waypoint altitude unchanged at 692.94 ft
BASE leg glidepath goes from 3.0 degrees to 1.4 degrees
Approach/final leg waypoint altitude goes from 433.80 ft to 572.16 ft
Approach/final leg length goes from 7881.2 ft to 10521.2 ft

EXAMPLE 5

If extension is min (0 ft):
Downwind glidepath goes from 3.0 degrees to 1.4 degrees
BASE waypoint altitude goes from 692.94 ft to 757.62 ft
BASE leg glidepath goes from 3.0 degrees to 3.8 degrees
Approach/final leg waypoint altitude is unchanged at 433.80 ft
Approach/final leg length is unchanged at 7881.2 ft

EXAMPLE 6

If extension is nominal (¼ mile=1320 ft):
Downwind glidepath goes from 3.0 degrees to 1.4 degrees
BASE waypoint altitude goes from 692.94 ft to 725.28 ft
BASE leg glidepath goes from 3.0 degrees to 2.6 degrees
Approach/final leg waypoint altitude goes from 433.80 ft to 502.98 ft
Approach/final leg length goes from 7881.2 ft to 9201.2 ft In some embodiments, the most important value may be the base leg glidepath, which varies from 1.4 deg to 3.7 deg. Even in the worst case scenario, the steepest the base leg glidepath may be is 3.8 deg. The minimum glidepath angle for the base leg may be 1.4 deg.

In some embodiments, the pattern planner module 254 may be configured to generate a pattern that moves the current BASE waypoint to be one turning radius in front of the aircraft at the current aircraft altitude. In some embodiments, when a "turn base" button in a user interface is clicked, by an aircraft pilot, a new position for the BASE waypoint may be calculated as one turning radius in front of the aircraft at the current aircraft altitude. In some embodiments, the "turn base" button may only be selectable after a downwind extension maneuver has been requested or begun. The current BASE waypoint may be moved to the new position, or in some embodiments, a new BASE waypoint may be generated at the new position. In some embodiments, a turning radius may be a predetermined value. In some embodiments, the turning radius may be computed during autopilot operation based on the current state of the aircraft, the type of aircraft or combination thereof. The turning radius may further correspond to a distance away from a waypoint such that when the autopilot makes its turn, the aircraft is lined up with the next waypoint segment. For example, the aircraft may use the turning radius to determine when to make a turn from a BASE waypoint towards a corresponding approach/final leg waypoint (FLEG waypoint 314 in FIGS. 3A-D).

The FLEG waypoint 314 may be moved so it is directly across from the BASE waypoint (in a direction perpendicular to the runway heading) at an altitude that keeps it on a 3 degree glidepath relative to its original position. In some embodiments, instead of moving the current approach/final leg waypoint, a new approach/final leg waypoint may be generated.

In some embodiments, the position calculation for these waypoints may be performed in the AMFS 200, pattern planner module 254, flight control system 202, guidance loop module 204, autopilot system 206, at the GCS 102, on operator device 108 or combination thereof. In some embodiments, after the moving of the BASE waypoint and approach/final leg waypoint, or the generating of a new BASE waypoint and approach/final leg waypoint, the autopilot may immediately start following this modified mission, and the mission may then be uploaded to the GCS 102. The modified mission upload to the GCS 102 may be triggered by the autopilot sending out a message which tells the GCS to request the updated mission.

The constraint generation module 280 may be configured to generate a set of constraint equations for each of the waypoints. The set of constraint equations for each waypoint, referred to herein as "waypoint constraint equations," may include one or more constraint equations. The constraint equations may place constraints on various parameters associated with the waypoints, such as waypoint location, time, and airspeed. The different constraint equations may be referred to as different "constraint equation types." Each waypoint may be subject to one or more constraint equation types. Any type of constraint equation described herein may be used at any single waypoint.

In some implementations, the constraint generation module 280 (e.g., the path plan constraint generation module 284) may generate location constraint equations for each waypoint. Location constraint equations for each waypoint may constrain the location of the waypoint in three dimensional space. For example, the waypoint may be subject to location constraints with respect to latitude, longitude, and altitude. As another example, the waypoint may be subject to location constraints with respect to X, Y, and Z coordinates, which may be relative (e.g., relative to the runway). The location constraint values for X, Y, and Z may be defined relative to the landing waypoint LAND (0, 0, 0) at the runway 102. In some implementations, the path plan constraint generation module 284 may generate path planning constraints based on terrain and/or obstacles.

In some implementations, the constraint generation module 280 may generate different types of constraint equations other than location constraint equations. For example, other types of constraint equations may include speed constraints (e.g., ground/air speed constraints) for the aircraft at the waypoints. For example, a minimum airspeed may be set at the stall speed for the aircraft. Other example types of constraint equations may include timing constraints for the aircraft at the waypoints (e.g., with respect to time of arrival at the waypoint). In one example, a waypoint may be subject to timing constraints with respect to arrival at the landing waypoint LAND. Other example types of constraint equations may include fuel constraints. Additional example constraints may include aircraft performance constraints, such as constraints on the dimensions of the flight pattern (e.g., minimum leg lengths). For example, larger and faster airplanes may extend the length of the legs for landing. In some implementations, the pilot or other aircraft operator may provide manual constraints. Example manual constraints may include a provided time of arrival.

A timing constraint generation module 288 may generate timing constraints based on the ATC-provided time of arrival, or other time of arrival. A traffic synchronization constraint generation module 282 (hereinafter "traffic synch module 282") may generate constraints based on traffic classification data. For example, the traffic synch module 282 may generate timing constraints, speed constraints, and distance constraints relative to other aircraft. In a specific example, the traffic synch module 282 may generate location constraints, timing constraints, and/or speed constraints that constrain the aircraft to follow an identified aircraft at a specific distance and/or time delay. In another specific example, the traffic synch module 282 may determine when another aircraft is landing and generate timing constraints for landing a period of time after the other aircraft.

The objective function generator module 286 may be configured to generate an objective function. The objective function may include one or more objective function terms associated with optimizing various flight parameters described herein. For example, the objective function may include terms for minimizing/maximizing location values, timing values, speed values, and/or fuel values. As another example, the objective function may include terms for minimizing/maximizing altitude, lengths of legs, width of the landing pattern, time of arrival (e.g., relative to another aircraft), time of flight, distance from other aircraft, and/or fuel consumption. The objective function terms may be included in a final objective function. For example, the final objective function may include a sum of the individual objective function terms.

In some implementations, the path planner module 254 may include a pre-processing module 290 that pre-processes the constraint equations prior to solving the objective function. For example, the pre-processing module 290 may be configured to remove redundant constraints.

The solver module 292 may solve the final objective function subject to the constraint equations. For example, the solver module 292 may minimize the objective function subject to the constraints. The solver module 292 may output the waypoint values for the solved objective function. The problem may be formulated in a variety of manners. For example, the problem may be formulated as at least one of a linear problem (LP), an integer problem (IP), a mixed-integer linear problem (MIP), and a quadratic problem. The solver module 292 may implement one or more algorithms that may include, but are not limited to, Branch-and-Bound, Branch-and-cut, a simplex algorithm, a dual simplex method, an upper bound technique, dynamic programming, quadratic programming, and non-convex programming.

The post-processing and verification module 294 (hereinafter "post-processing module 294") may be configured to receive the solution from the solver module 292. The post-processing module 294 may determine whether to relax the constraints. For example, the post-processing module 294 may relax the constraints when the solver module 292 indicates that there is not a viable solution for the objective function. In this implementation, the constraint generation module 280 may relax some constraints by removing constraints and/or modifying the values of some constraints in block 1100.

The post-processing module 294 may verify the solution. For example, the post-processing module 294 may generate the trajectory of waypoints for the flight pattern based on the solution and verify that the trajectory is valid for the aircraft based on current conditions, such as weather, terrain, and the location of other aircraft. If the solution is not viable, the AFMS 200 may recalculate the flight pattern. The post-processing module 294 may provide the flight pattern to the flight control system 202. The flight control system 202 may control the aircraft 101 according to the flight pattern.

Figure 2E:
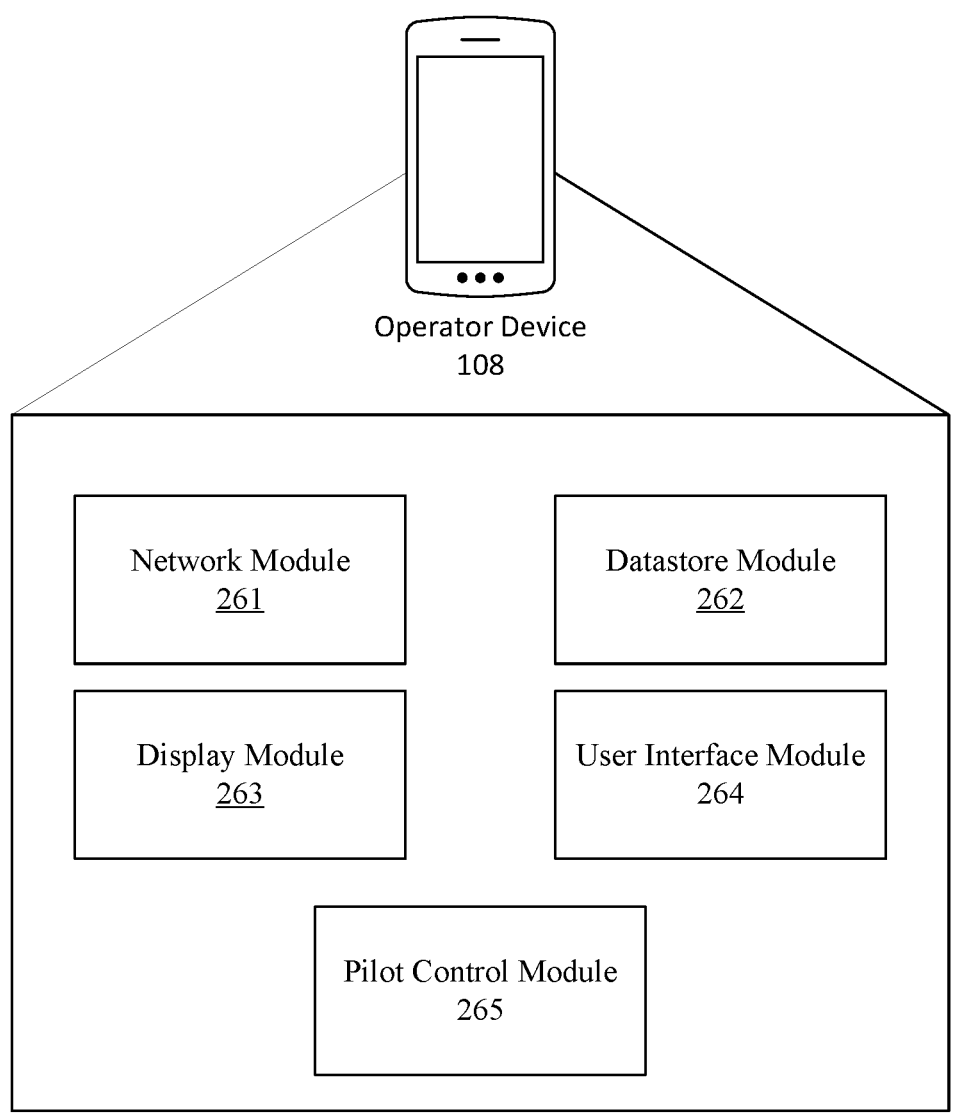
FIG. 2E is a diagram illustrating an exemplary operator device in accordance with aspects of the present disclosure.

FIG. 2E is a diagram illustrating an exemplary operator device 108 in accordance with aspects of the present disclosure. Operator device 108 may comprise network module 261, datastore module 262, display module 263, user interface module 264 and pilot control module 265. Network module 261 may be configured to communicate with GCS 102 or aircraft 101. Datastore module 262 may be any device capable of storing computer readable instructions, data related to the flight and mission of aircraft 101, data used in the displaying of user interface components on the operator device 108, or combination thereof. Display module 263 may be an LCD, AMOLED, TFT, or any other device configured to display graphical or textual data to a user. User interface module 264 and pilot control module 265 may be the same or similar to the pilot I/O 236, pilot display 238 and pilot controls 240 of FIG. 2A. Additional operation of the user interface module 264 and pilot control module 265 will be discussed with regards to FIGS. 4A-4F.

Figure 3A:
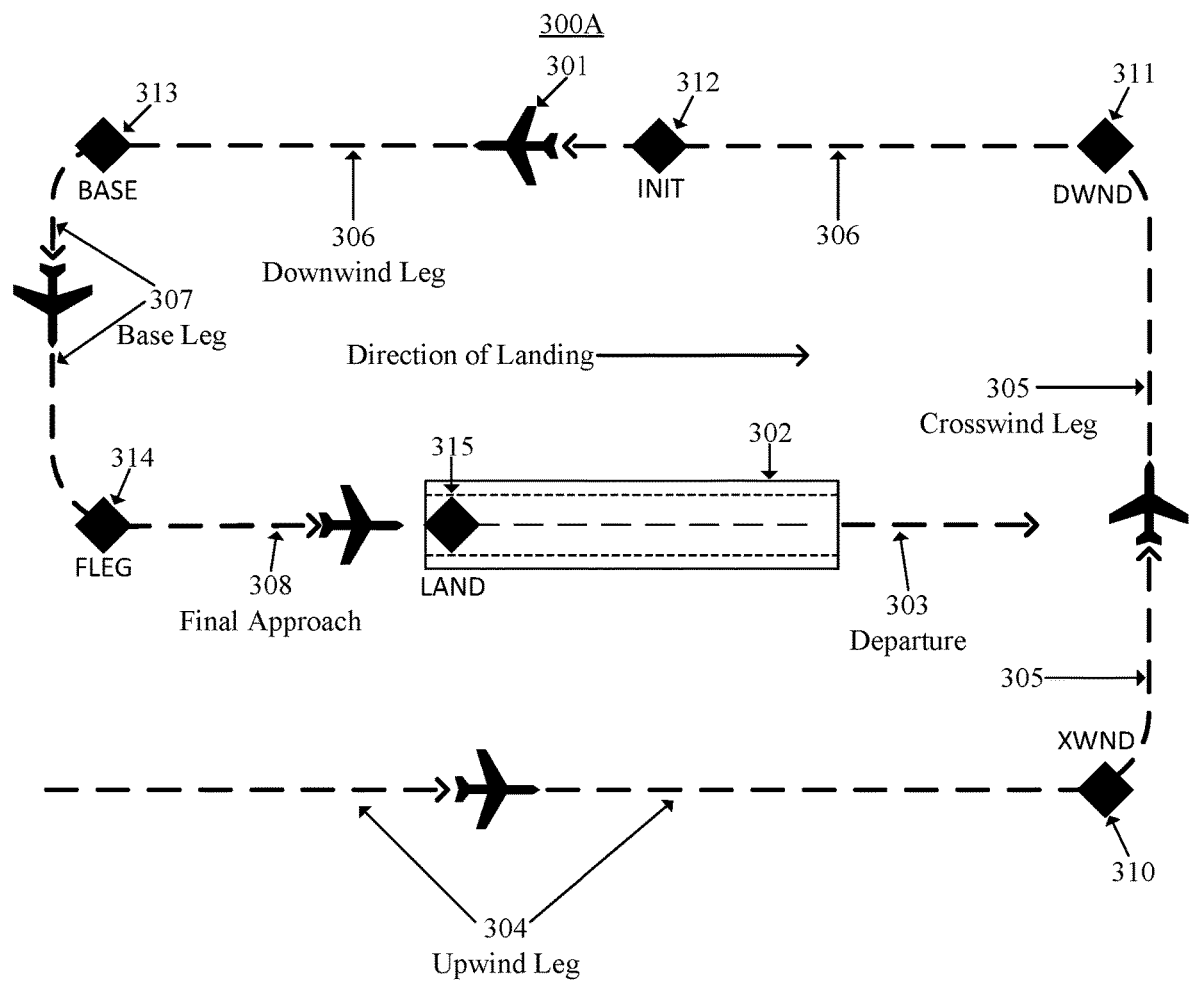
FIG. 3A is a diagram illustrating an exemplary nominal landing pattern in accordance with some embodiments.

FIG. 3A is a diagram illustrating an exemplary nominal landing pattern 300A in accordance with some embodiments. Landing pattern 300A may comprise departure leg 303, upwind leg 304, crosswind leg 305, downwind leg 306, base leg 307, final leg 308, crosswind waypoint (XWND) 310, downwind waypoint (DWND) 311, initial descent waypoint (INIT) 312, base waypoint (BASE) 313, final leg waypoint (FLEG) 314, and landing waypoint (LAND) 315. The waypoints are overlaid onto an example traffic pattern around airport runway 102.

The downwind leg 306 may refer to a flight path parallel to the landing runway 102 in the opposite direction of landing. The base leg 307 may refer to a flight path at approximately a right angle to the landing runway off the runway's approach end and extending from the downwind leg 306 to the intersection of the extended runway centerline. The final leg 308 may refer to a flight path in the direction of landing along the extended runway centerline from the base leg 307 to the runway 102. The departure leg 303 may refer to a flight path that begins after takeoff and continues straight ahead along the extended runway centerline. The departure climb may continue until reaching a point beyond the departure end of the runway 102 (e.g., ½ mile) and within a distance of the traffic pattern altitude (e.g., 300 ft). The crosswind leg 305 may refer to a flight path at approximately a right angle to the runway off the runway's takeoff end. An upwind leg 304 may refer to a flight path parallel to the landing runway 102 in the direction of landing.

The flight pattern may include a sequence of waypoints 310-315 that define a target flight path for the aircraft 101. The diamonds represent waypoints 310-315 that the aircraft 101 may fly through/by in a sequence. In some examples, a fly-through waypoint may refer to a waypoint that the aircraft should reach before turning. In some examples, a fly-by waypoint may refer to a waypoint for which the aircraft should initiate the turn before reaching the waypoint (e.g., "cutting" the corner). The figures herein represent a two dimensional version of the flight path, although an altitude may be associated with each waypoint. As illustrated in FIGS. 3A-3D, a landing pattern may include a plurality of waypoints that define a flight path that terminates at a landing waypoint 315 (LAND 315) on the runway 102. In some cases, a landing pattern may define a sequence of waypoints around the runway 102 that define a quadrilateral shape (e.g., a rectangle or trapezoid) that includes the runway 102 along a leg of the quadrilateral shape.

A flight pattern may be generated from a plurality of selectable waypoints 310-315. The waypoint names may be representative of the beginning of the leg. As illustrated in FIGS. 3A-3D, example selectable waypoints may include, but are not limited to, a downwind waypoint 311 (DWND 311), an initial descent waypoint 312 (INIT 312), a base waypoint 313 (BASE 313), a final leg waypoint 314 (FLEG 314), a landing waypoint 315 (LAND 315), and a crosswind waypoint 310 (XWND 310). The AFMS 200 may generate flight patterns including different numbers of waypoints described herein. For example, the AFMS 200 can generate a landing pattern including a subset of the waypoints 310-315.

The waypoints illustrated in FIGS. 3A-3D define a plurality of legs, which may be referred to as "flight pattern legs" or "pattern legs." The pattern legs may extend from one waypoint to another. The pattern legs may form a flight pattern shape. A flight pattern shape that includes the waypoints 310-315 of FIGS. 3A-3D may be a quadrilateral shape (e.g., a trapezoidal shape) that includes the runway 102 along one of the legs. The waypoints 310-315 may define the vertices of the quadrilateral flight pattern in some cases. In some implementations, the flight pattern may include waypoints that define target locations along the pattern legs (e.g., an INIT waypoint 312). The target locations along the pattern legs (e.g., INIT 312) may define "pattern leg segments." For example, in some implementations, the final leg 308 may include two leg segments divided by an additional waypoint.

The waypoints illustrated in FIGS. 3A-3D are described as being included in a landing pattern. Referring to FIGS. 3A-3D, the DWND waypoint 311 may be the start of the downwind leg 306 of the landing pattern (e.g., see FIG. 3A). The downwind leg 306 may extend to the BASE waypoint 313. In some implementations, the downwind leg 306 may include two leg segments divided by the INIT waypoint 312. In some cases, the autopilot system 206 may be controlling the operation of the aircraft 301. The aircraft may be flying level upon reaching the DWND waypoint 311. During the downwind leg 306, the aircraft may be flying parallel to the runway 102. In some implementations, the DWND waypoint 311 can be located anywhere from the X coordinate of the LAND waypoint 315 (0, 0, 0) to a position in the positive X direction (e.g., east of the runway 102).

At some point on the downwind leg 306 (e.g., the INIT waypoint 312), the autopilot system 206 controls the aircraft 101 to begin an initial descent. The INIT waypoint 312 may be a point of transition from level flight to final landing. For example, the INIT waypoint 312 may provide for an initial descent such that the aircraft reaches the BASE waypoint 313 with a proper altitude and airspeed.

An example set of aircraft procedures according to an example landing pattern is now described with respect to the waypoints of FIG. 3A. The example landing pattern assumes the aircraft joins the landing pattern on the upwind leg 304 and flies parallel to the runway. At the XWND waypoint 310, the autopilot system 206 may turn the aircraft 101 towards the runway at approximately 90 degrees. The aircraft 101 may then continue towards DWND waypoint 311, where the autopilot system 206 may control the aircraft to perform another 90 degree turn in the same direction. The aircraft may then fly parallel to the runway (e.g., at a level flight altitude) on the downwind leg 306. At the INIT waypoint 312, the autopilot system 206 may control the aircraft 101 to decelerate, start deploying flaps, landing gears, and descending. At the BASE waypoint 313, the autopilot system may control the aircraft 101 to turn left towards the runway 102 (e.g., at approximately 90 degrees in some cases). In some implementations, the aircraft 101 may decelerate, deploy flaps, and/or descend. At the FLEG waypoint 314, the autopilot system 206 may control the aircraft 101 to turn left to align with the centerline of the runway 102. The autopilot system may also correct altitude and descent rate of the aircraft 101, to ensure that the aircraft 301 tracks the glideslope. The glideslope may refer to the proper path of descent for an aircraft preparing to land (e.g., approximately a 3-degree line from the runway 102). If the aircraft 101 is below the glideslope, the autopilot system 206 may maintain altitude of the aircraft 101 (e.g., not climb) until reaching the glideslope. Once the aircraft 101 is on the glideslope, the autopilot system 206 may control the aircraft so as to track the glideslope until landing, maintain airspeed, and further deploy flaps. The aircraft 101 may land at the LAND waypoint 315.

In some implementations, the flight pattern may use the XWND waypoint 310 as a starting waypoint for the flight pattern. For example, the AFMS 200 may use the XWND waypoint 310 as a starting waypoint in a landing pattern. As another example, the AFMS 200 may use the XWND waypoint 310 as a starting waypoint for a takeoff pattern where the aircraft flies towards the XWND waypoint 310, turns approximately 90 degrees, and then flies towards the DWND waypoint 311. In some implementations, the XWND waypoint 31 may be used as a starting waypoint after an aborted landing. For example, in response to an aborted landing, the AFMS 200 may generate a new landing pattern that includes the XWND waypoint 310 as the starting waypoint.

Figure 3B:
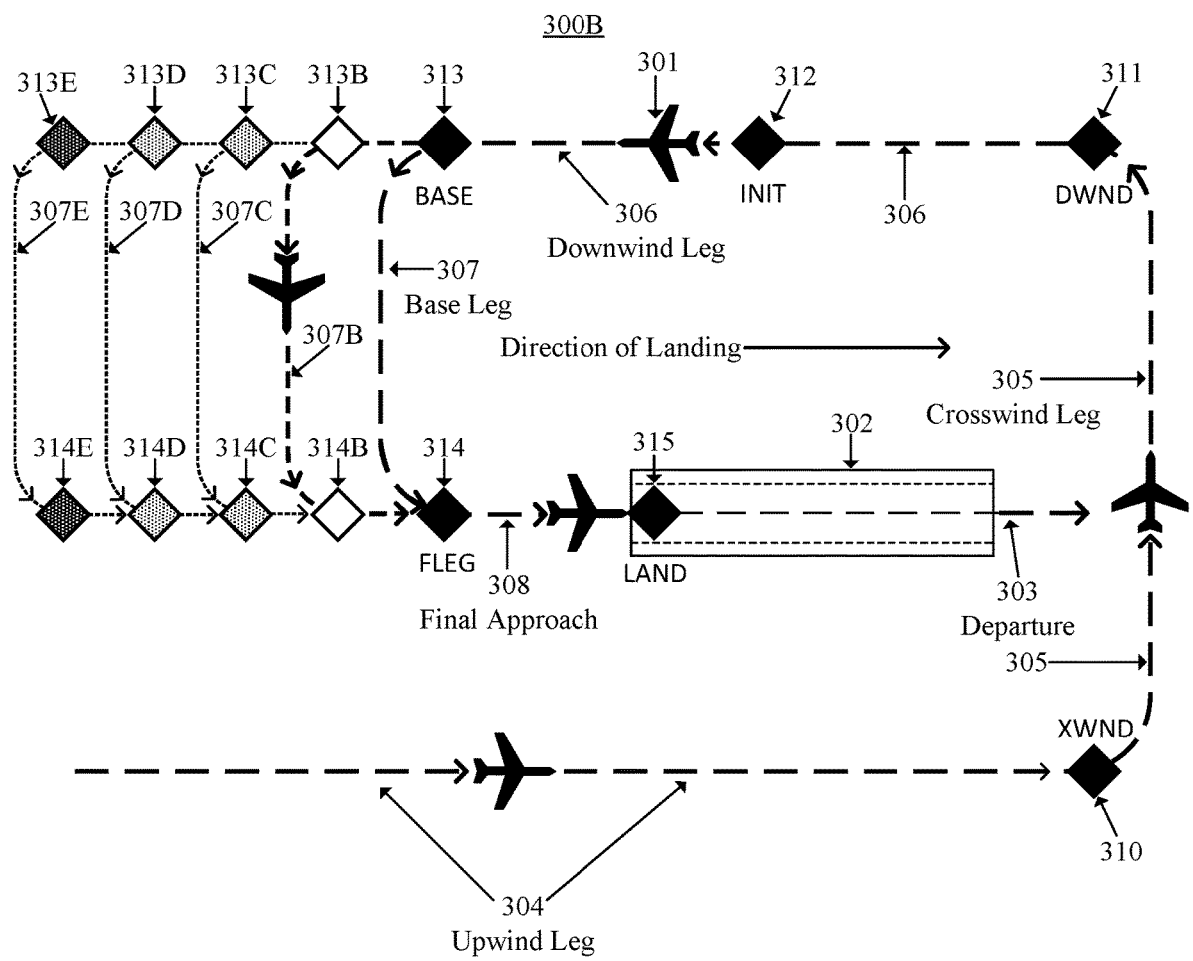
FIG. 3B is a diagram illustrating an exemplary landing pattern with multiple downwind extensions in accordance with some embodiments.

Regarding FIG. 3B, the diagram illustrates one or more downwind extensions made to a landing pattern 300B. In some embodiments, when the aircraft is being controlled by the autopilot system 206, the aircraft pilot may choose to extend downwind in the pattern. The downwind extension may correspond to a flight maneuver whereby the downwind leg is lengthened to provide more spacing between landing aircraft. In some embodiments, the aircraft pilot may choose to extend downwind indefinitely. In other embodiments, the number of downwind extensions may be capped at a predetermined number of downwind extensions. In some embodiments, the aircraft pilot may be provided with a user interface, from which they may instruct the autopilot system 206 of the aircraft 301 to perform a downwind extension procedure. The instruction may be triggered by the aircraft pilot selecting or clicking on a button within the user interface, which may then trigger a downwind extension procedure to be performed by the autopilot system 206.

FIG. 3B shows an example of modified landing patterns that may be generated as a result of the aircraft pilot choosing to extend downwind. The original BASE waypoint 313 and FLEG waypoint 314 are shown in solid black. At any time before reaching BASE waypoint 313 the aircraft pilot may choose to extend downwind. This first extension results in the generation of BASE waypoint 313B and FLEG waypoint 314B as well as a base leg 307B between BASE waypoint 313B and FLEG waypoint 314B. The aircraft pilot may subsequently instruct the aircraft 301 to perform additional downwind extensions resulting in additional BASE waypoints, FLEG waypoints, and base legs being generated for each of the additional downwind extensions. For example, FIG. 3B shows the resulting waypoints (BASE waypoints 313C-D and FLEG waypoints 314C-D) and base legs 307C-D generated from two additional downwind extensions selected by the aircraft pilot. In some embodiments, a default turn to base operation may be triggered if the pilot has not requested a turn-to-base before reaching a predetermined BASE waypoint 313E. This may be used to guarantee that the aircraft 301 does not continue to fly straight forever in the case of an inoperative datalink. In some embodiments, the BASE waypoints 313B-D, FLEG waypoints 314B-D, and base legs 307B-D may be generated so as to keep the aircraft 301 tracking a glideslope of 3-degrees on final approach. The generation of the BASE waypoints 313B-D, FLEG waypoints 314B-D, and base legs 307B-D may be performed by the AFMS 200, flight control system 202, guidance loop module 204, autopilot system 206, operator device 108 or combination thereof.

In some embodiments, the system may be configured to interpolate an altitude, for each of the base legs 307B-D, between the aircraft altitude and the 3-degree glideslope for the final approach 308. In some embodiments, if the aircraft is below the 3-degree glideslope, the aircraft may be instructed to maintain a constant altitude on the base leg. The interpolated altitude for each of the base legs 307B-D may be generated by the AFMS 200, guidance loop module 204, or operator device 108.

Figure 3C:
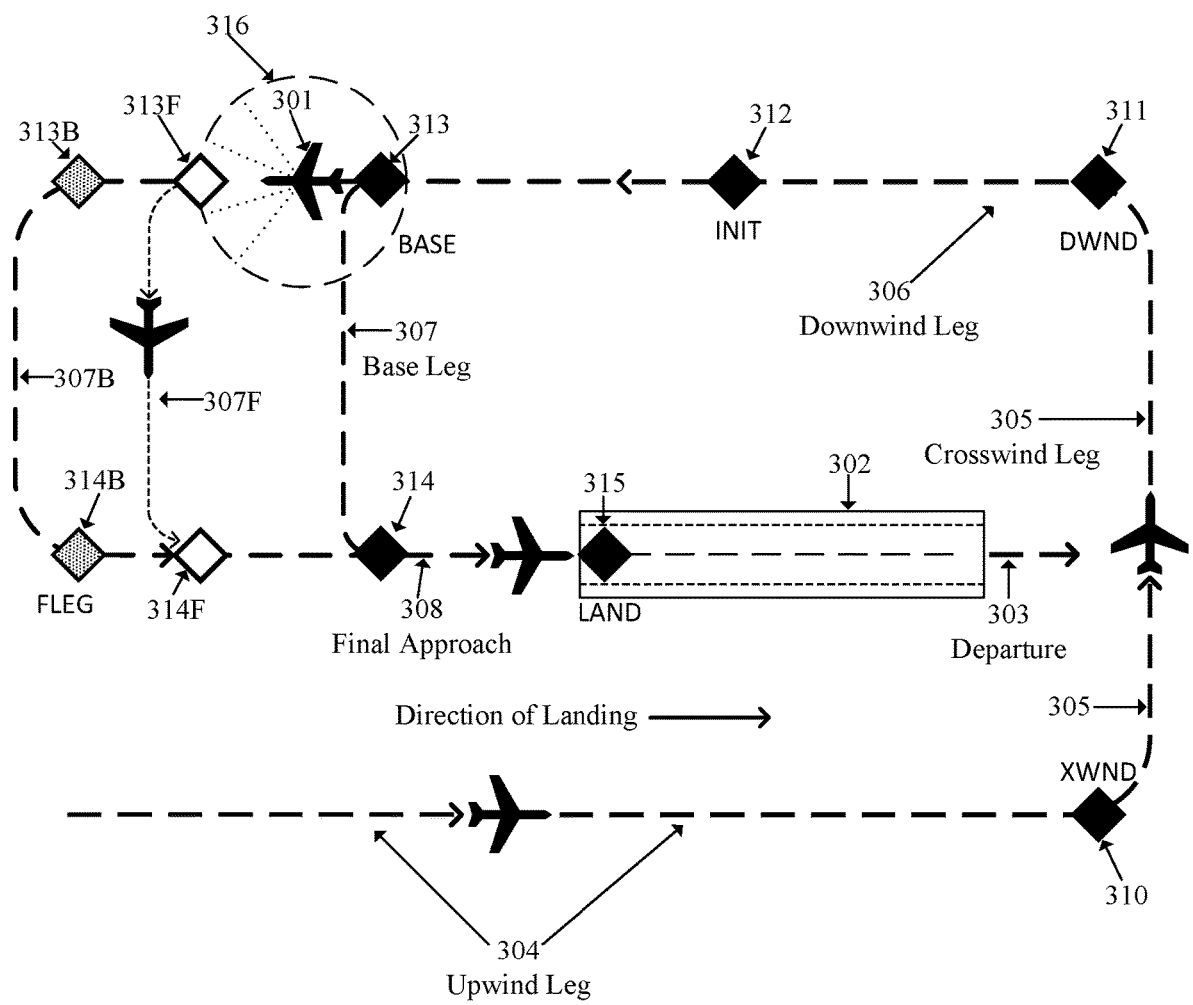
FIG. 3C is a diagram illustrating an exemplary landing pattern where the aircraft has been instructed to turn base in accordance with some embodiments.

Regarding FIG. 3C, the diagram illustrates landing pattern 300C resulting from an aircraft pilot choosing to turn base before reaching the BASE waypoint 313. In some embodiments, the aircraft may be under control of autopilot system 206. While operating under autopilot system 206, the aircraft pilot may be provided with an interface from which they may choose or select a button which commands the aircraft 301 to initiate a turn to base procedure. The button may only be selectable in instances where a downwind extension has already been requested (selected by the pilot) and/or is being performed. The turn to base procedure may be initiated before reaching the BASE waypoint 313B. The turn to base procedure may be configured to generate a BASE waypoint 313F, FLEG waypoint 314F, and base leg 307F for the landing pattern. The generation of the BASE waypoint 313F, FLEG waypoint 314F, and base leg 307F may be performed by the AFMS 200, flight control system 202, guidance loop module 204, autopilot system 206, operator device 108 or combination thereof. In some embodiments, the BASE waypoint 313F may be generated at a predetermined radius in front of the current position of the aircraft 301 and at the current altitude of the aircraft. The predetermined radius may be the turning radius of the aircraft 301. In some embodiments, the altitude and radius may be determined based on the current state of the aircraft, the positioning and state of other aircraft in the landing pattern, or weather information received for the area. In some embodiments, the altitude may be adjusted to a value different from the current aircraft altitude.

Figure 3D:
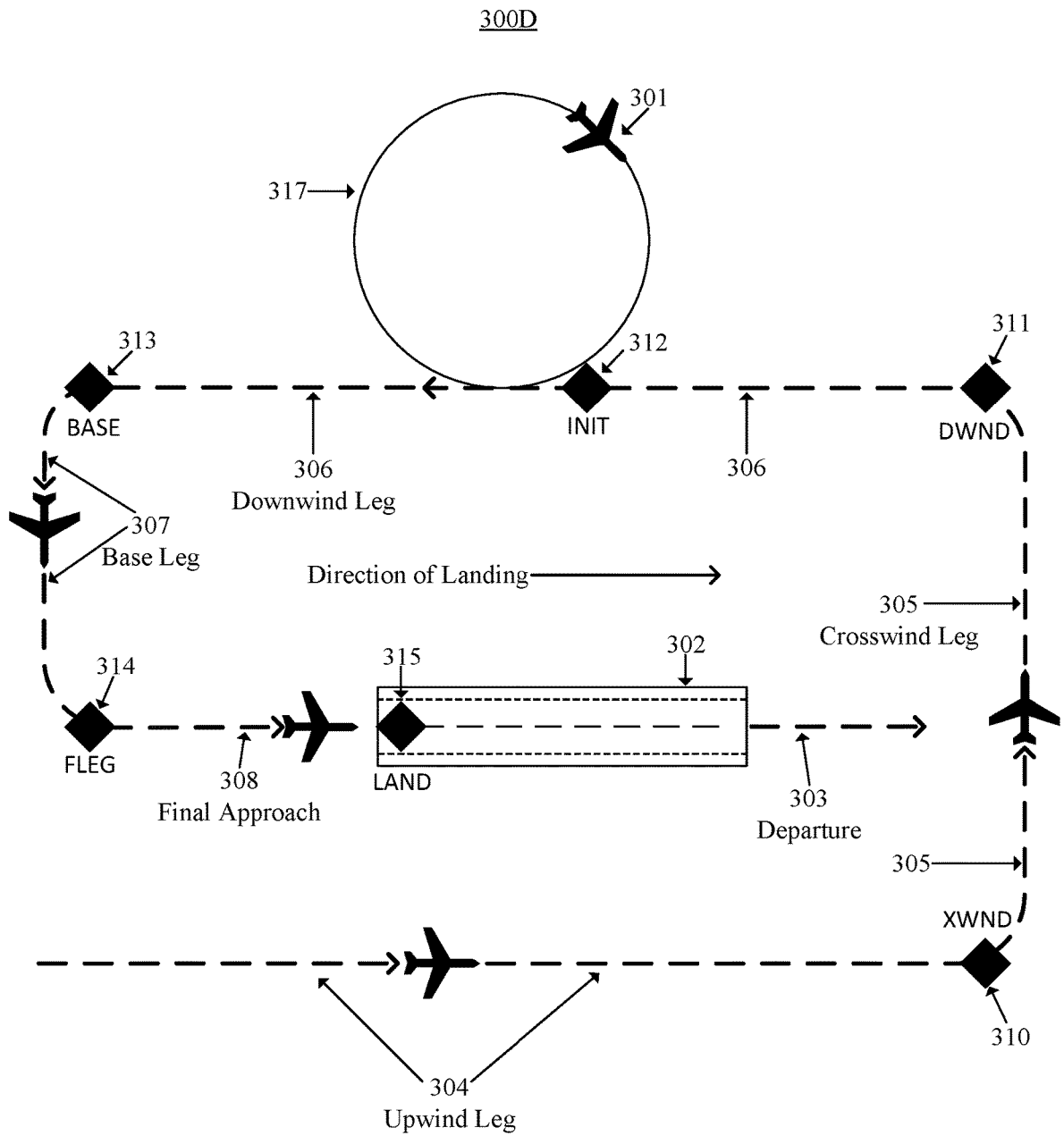
FIG. 3D is a diagram illustrating an exemplary landing pattern with a right 360 degree in accordance with some embodiments.

Regarding FIG. 3D, the diagram illustrates landing pattern 300D resulting from a pilot choosing to perform a 360 before reaching the BASE waypoint 313. In some embodiments, the aircraft may be under control of autopilot system 206. The aircraft pilot may be provided with an interface from which they may choose or select a button which commands the aircraft 301 to initiate a 360 degree maneuver before reaching the BASE waypoint 313. The interface may provide the aircraft pilot with different buttons for triggering a right and left 360 degree maneuver. In some embodiments, if the aircraft 301 is not in the traffic pattern/landing pattern, the aircraft pilot may choose/select the right or left 360 degree maneuver button, resulting in a corresponding right or left 360 degree maneuver command being transmitted to the aircraft 301 and initiating the performance of the selected command by the aircraft. Similarly, if the aircraft 301 is on a straight-in, both the left 360 and right 360 maneuver buttons may be selectable by the aircraft pilot. If the aircraft is in the traffic pattern, only one of the 360 degree maneuver buttons may be selectable by the aircraft pilot. For example, only the 360 degree maneuver button corresponding to turning the aircraft away from the runway 302 may be selectable, while the opposite 360 degree maneuver button may be greyed out and not selectable. In some embodiments, the 360 degree maneuver buttons may only be selectable if the autopilot system 206 is engaged in a mission mode and navigating to a normal waypoint. In some embodiments, the 360 degree maneuver buttons may be selectable at any time while the aircraft is navigating between airports. During en route navigation, the pilot may wish to select either of the 360 degree maneuver buttons to perform a 360 degree maneuver for many reasons. For example, the pilot may wish to either climb or descend without continuing to travel forward, or if the pilot wishes to generally hold position to allow another aircraft to cross the aircraft's path ahead of the aircraft's current position.

In some embodiments, the GCS 102, operator device 108, AFMS 200, pilot I/O 236, pilot displays 238, pilot controls 240, user interface module 264, the pilot control module 265 or combination thereof may be configured to identify the traffic/landing pattern and determine which leg of the pattern (if any) the aircraft is on.

In some embodiments, the selection of the left 360 degree maneuver button or right 360 degree maneuver button may result in the autopilot system 206 tracking a circle of a predetermined radius around a specified point. The specified point may be computed as a point that is one radius away from the aircraft, in a direction perpendicular to the current waypoint segment track. The autopilot system 206 may track a circle with a given radius around that point.

FIGS. 4A-4F illustrate an exemplary UAV pilot user interface 400 in accordance with some embodiments. The user interface 400 may comprise overlays for aircraft 401, runway 402, downwind leg 406, base legs (407, 407B, 407C, and 407F), final approach 408, initial descent waypoint (INIT) 412, base waypoints (BASE 413, 413B, 413C, and 413F), final leg waypoint (FLEG 414, 414B, 414C, and 414F), landing waypoint (LAND) 415, 360 path 417, flight instruments 420, aircraft State 421, UI control 430, left 360 button 431, extend downwind button 432, turn base button 433, and cancel left 360 button 434.

Flight instruments 420 may include a compass and attitude indicator. Aircraft State 421 may include information related to the current state of the aircrafts such as, but not limited to, altitude, airspeed, ground speed, roll, distance to waypoint, distance to top of descent, wind speed, wind direction, crab angle, climb rate, and pitch.

Figure 4A:
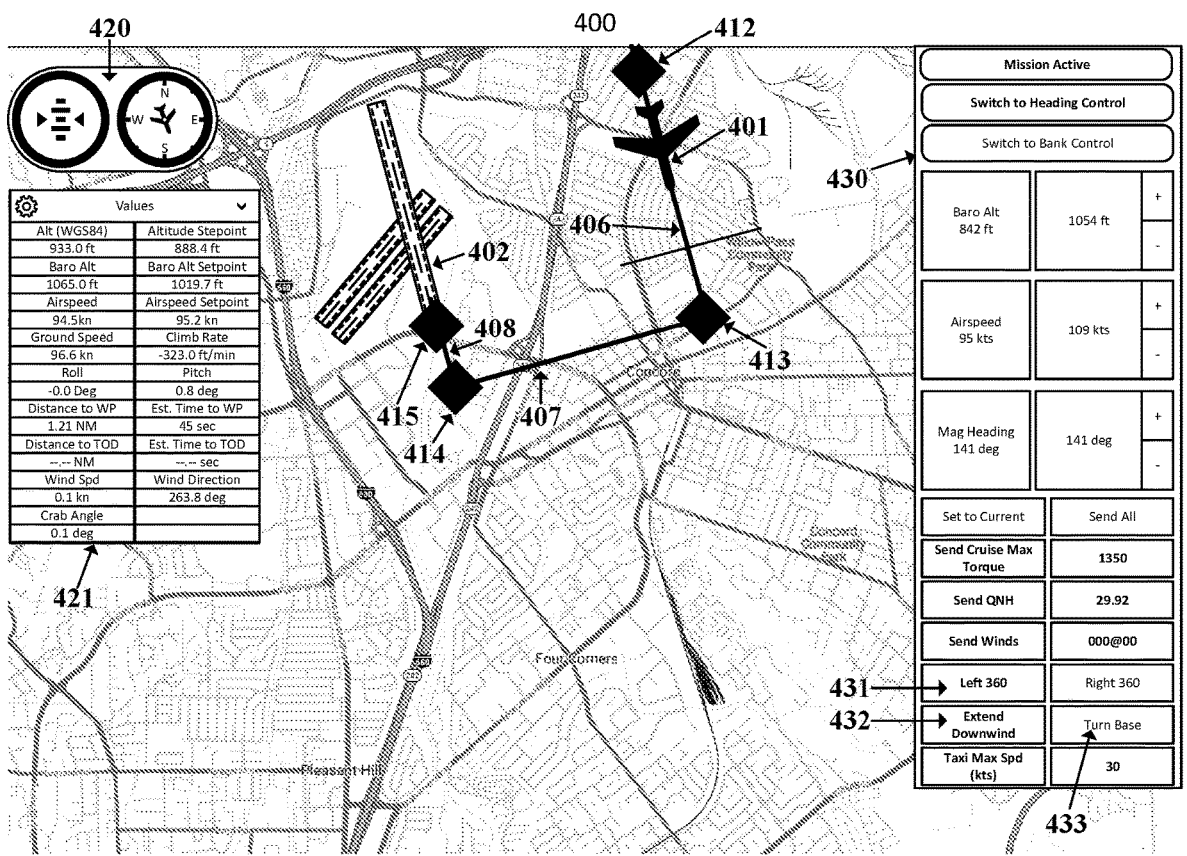
FIG. 4A is an exemplary UAV pilot user interface in accordance with some embodiments.

UI control 430 may be configured to display information related to the aircrafts mission and autopilot setpoints. In some embodiments, the UI control may include may include buttons for switching between a mission mode, a heading control mode, and a bank control mode. The UI control 430 may further include a baro altitude adjustment element, an airspeed adjustment element, and a mag heading adjustment element. The UI control 430 may be configured to receive a pilot selection of one or more buttons or elements. In FIG. 4A, the aircraft 401 is being controlled by an autopilot system in a mission mode. The autopilot is controlling the aircraft 401 so that it tracks downwind leg 406.

Figure 4B:
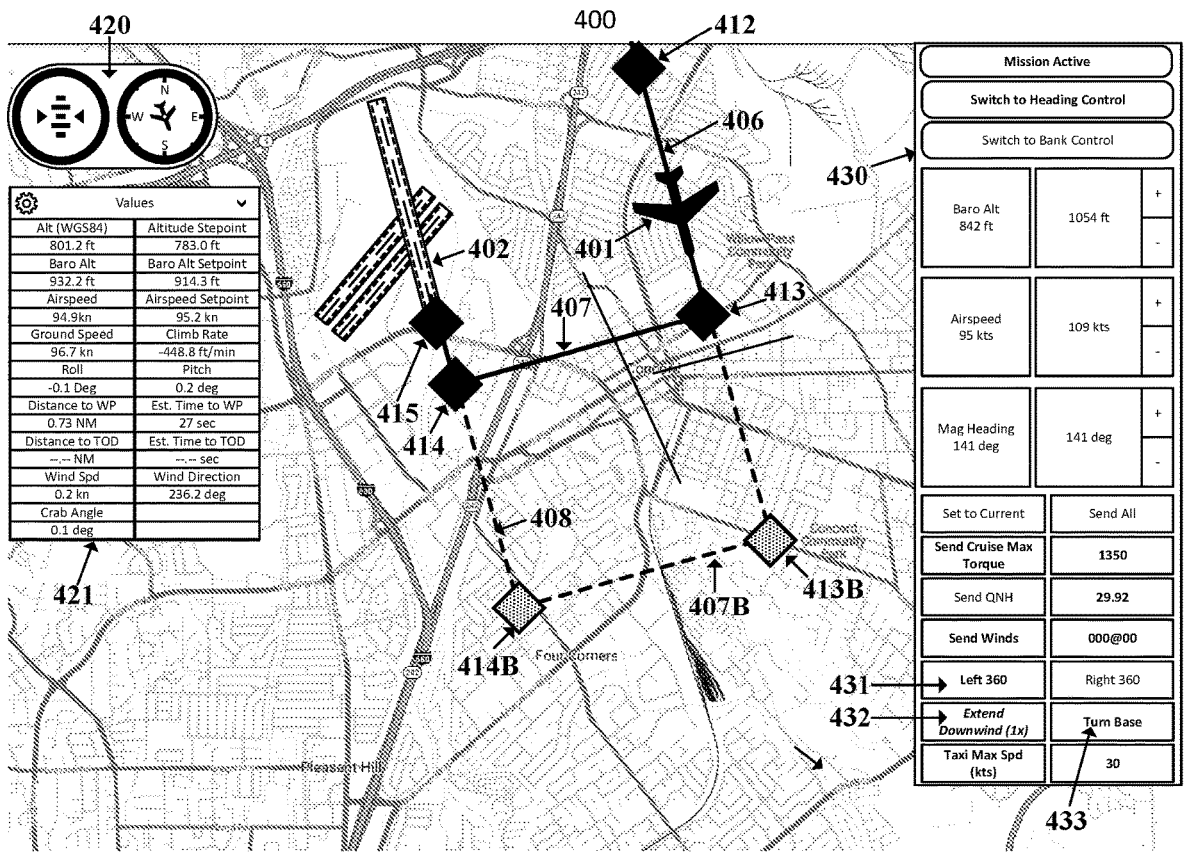
FIG. 4B is an exemplary UAV pilot user interface in accordance with some embodiments.

FIG. 4B illustrates the UAV pilot user interface 400 when a pilot chooses to extend downwind during the autopilot tracking of the landing pattern. Upon selection of the extend downwind button 432 by the pilot, the extend downwind button may be highlighted and the text changed to indicate that a downwind extension has been selected and begun. An indication of the number of downwind extensions performed may also be shown on the downwind extension button ("1×", "2×" . . . "n×"). Upon selection of the downwind extension button, the autopilot (AFMS 200, flight control system 202, and/or guidance loop module 204) may calculate a new BASE waypoint 413B, new FLEG waypoint 414B and new base leg 407B. After the generation of the new waypoints, the autopilot may be controlled so as to track the new landing pattern. In some embodiments, upon the selection of the downwind extension button, the turn base button 433 may become selectable. In some embodiments, the turn base button 433 may only become selectable while currently performing a downwind extension and after the aircraft has reached/passed the original BASE waypoint 413.

Figure 4C:
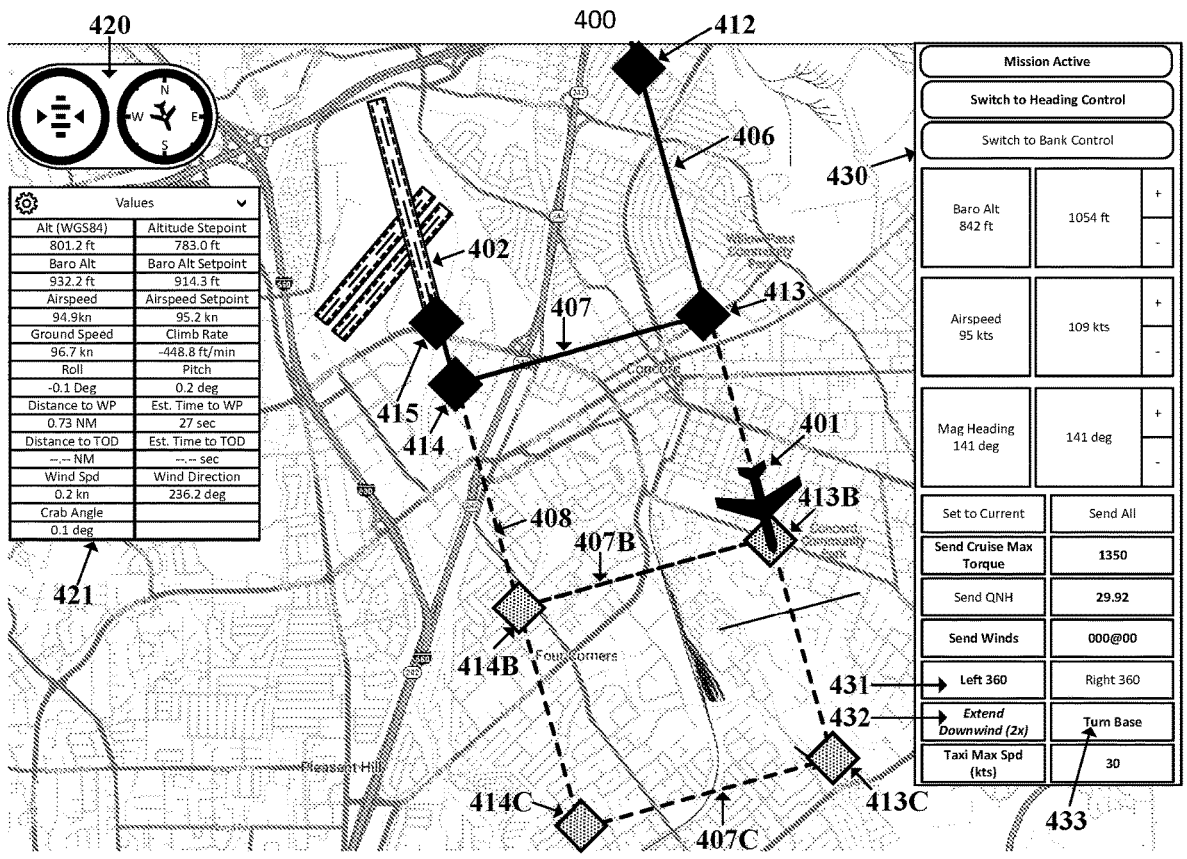
FIG. 4C is an exemplary UAV pilot user interface in accordance with some embodiments.

FIG. 4C illustrates the UAV pilot user interface 400 when a pilot chooses to extend downwind a second time during the autopilot tracking of the landing pattern. Upon the second selection of the extend downwind button 432 by the pilot, the extend downwind button may be updated to indicate that a second extension has been requested. The autopilot (AFMS 200, flight control system 202, and/or guidance loop module 204) may also calculate a new BASE waypoint 413C, new FLEG waypoint 414C and new base leg 407C after the second selection of the extend downwind button. After the generation of the new waypoints, the autopilot may be controlled so as to track the new landing pattern.

Figure 4D:
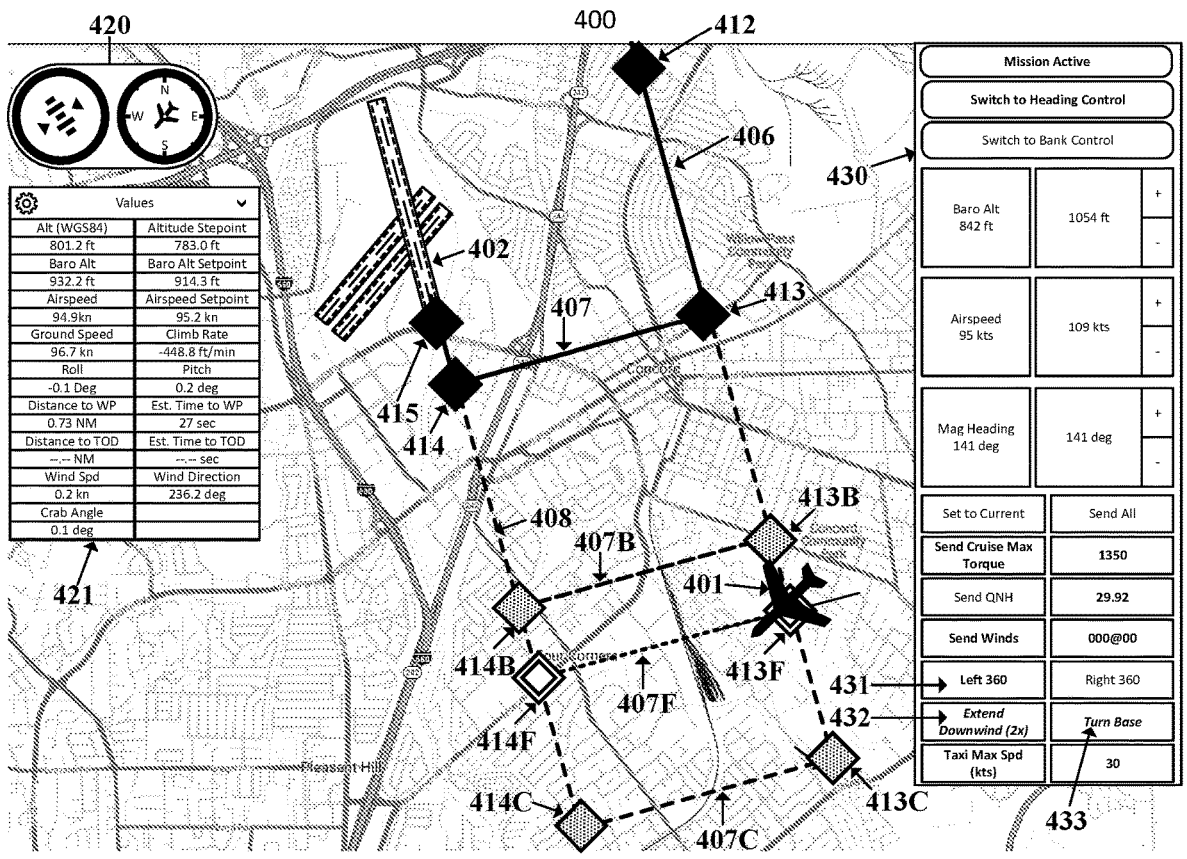
FIG. 4D is an exemplary UAV pilot user interface in accordance with some embodiments.

FIG. 4D illustrates the state of the aircraft 401 and the UAV pilot user interface 400 after the pilot has selected the turn base button 433. In some embodiments, may be grayed out until a downwind extension has been selected/requested by the pilot. In some embodiments, when the turn base button is selected, the extend downwind button 432 may be greyed out and unselectable. Upon selection of the turn base button 433, the autopilot (AFMS 200, flight control system 202, and/or guidance loop module 204) may calculate a new BASE waypoint 413F, new FLEG waypoint 414F and new base leg 407F. The aircraft 401 may be controlled by the autopilot to track the new waypoints and legs once they are generated.

Figure 4E:
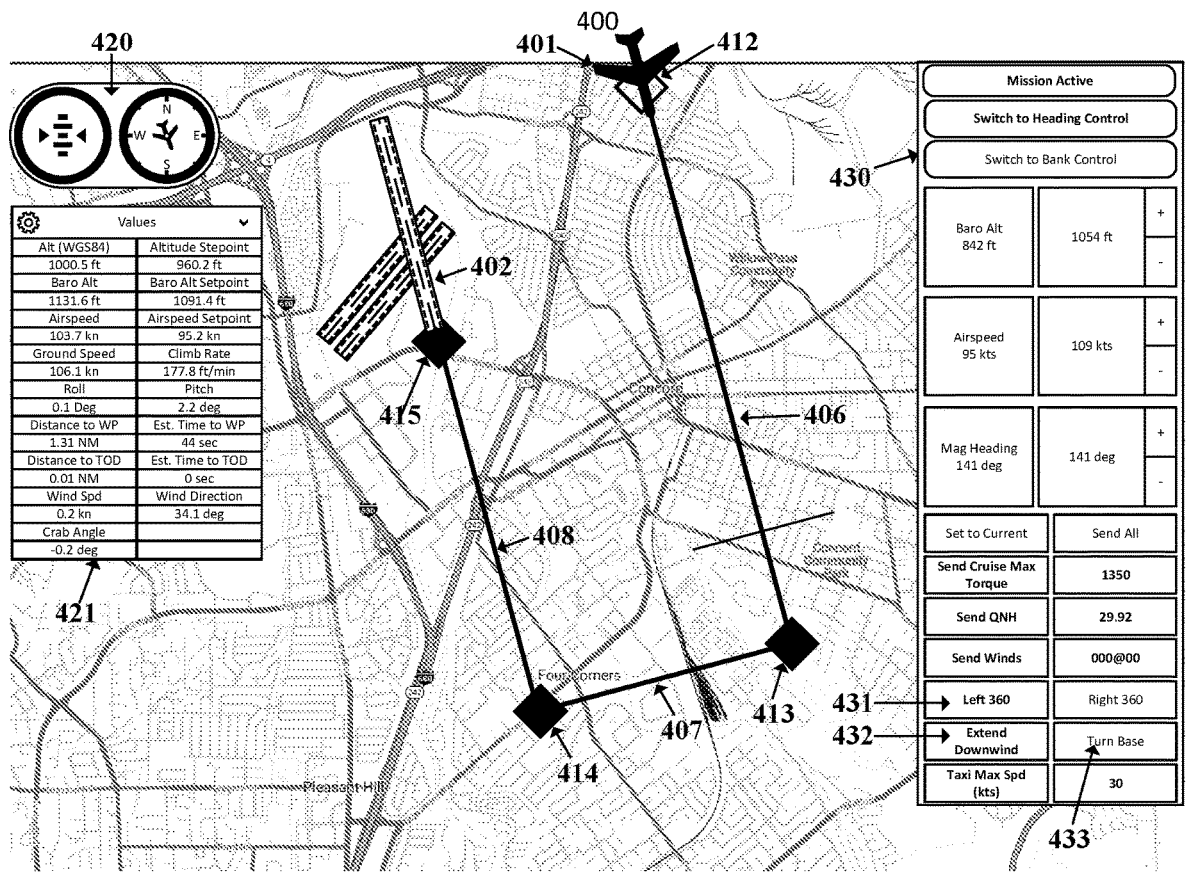
FIG. 4E is an exemplary UAV pilot user interface in accordance with some embodiments.
Figure 4F:
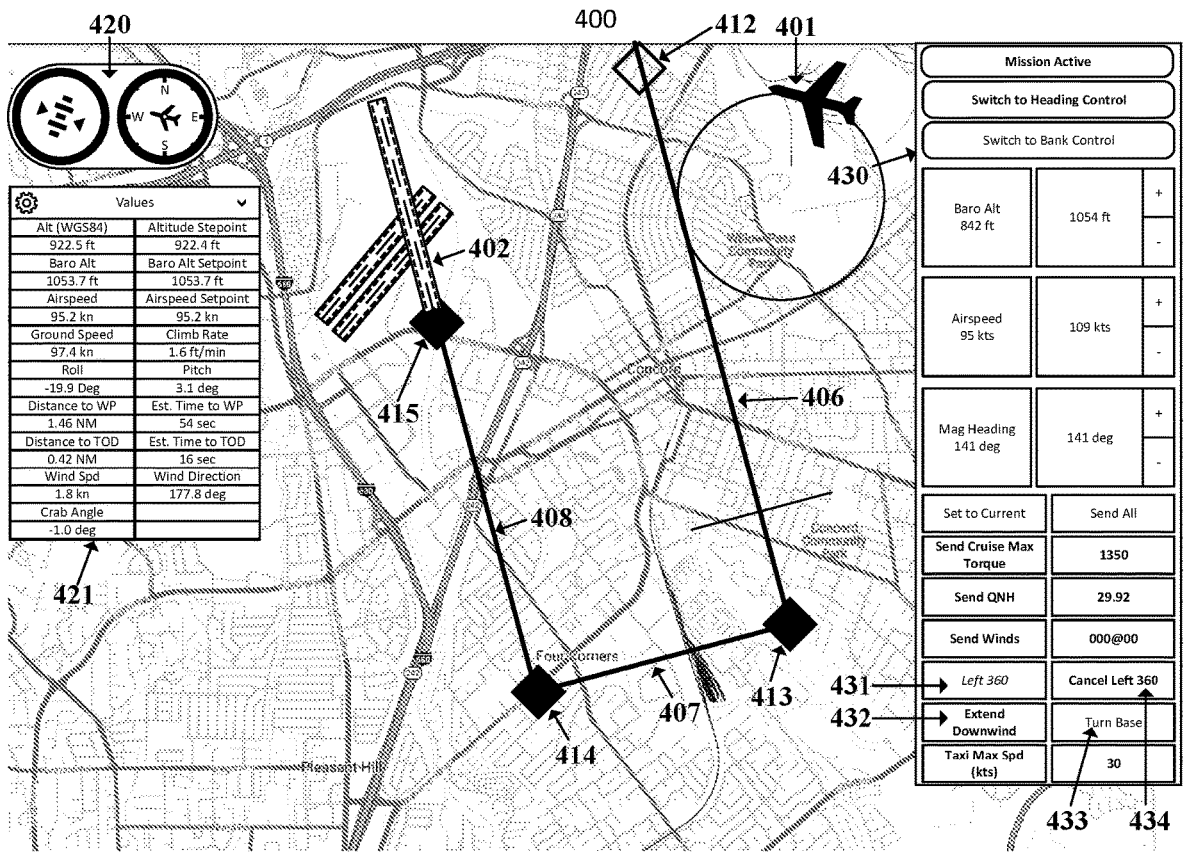
FIG. 4F is an exemplary UAV pilot user interface in accordance with some embodiments.

FIGS. 4E-F show the selection and instantiation of a 360 degree maneuver. The pilot may select the left 360 button to trigger a left 360 degree maneuver. Upon selecting the left 360 button, the button is highlighted (turned bold or change in color such as green) and the right 360 button is changed to a cancel left 360 button 434. The pilot may cancel the 360 degree maneuver at any time during the maneuver by selecting the cancel left 360 button 434. Cancelation of the maneuver may return the autopilot to normal mission navigation.

Figure 5A:
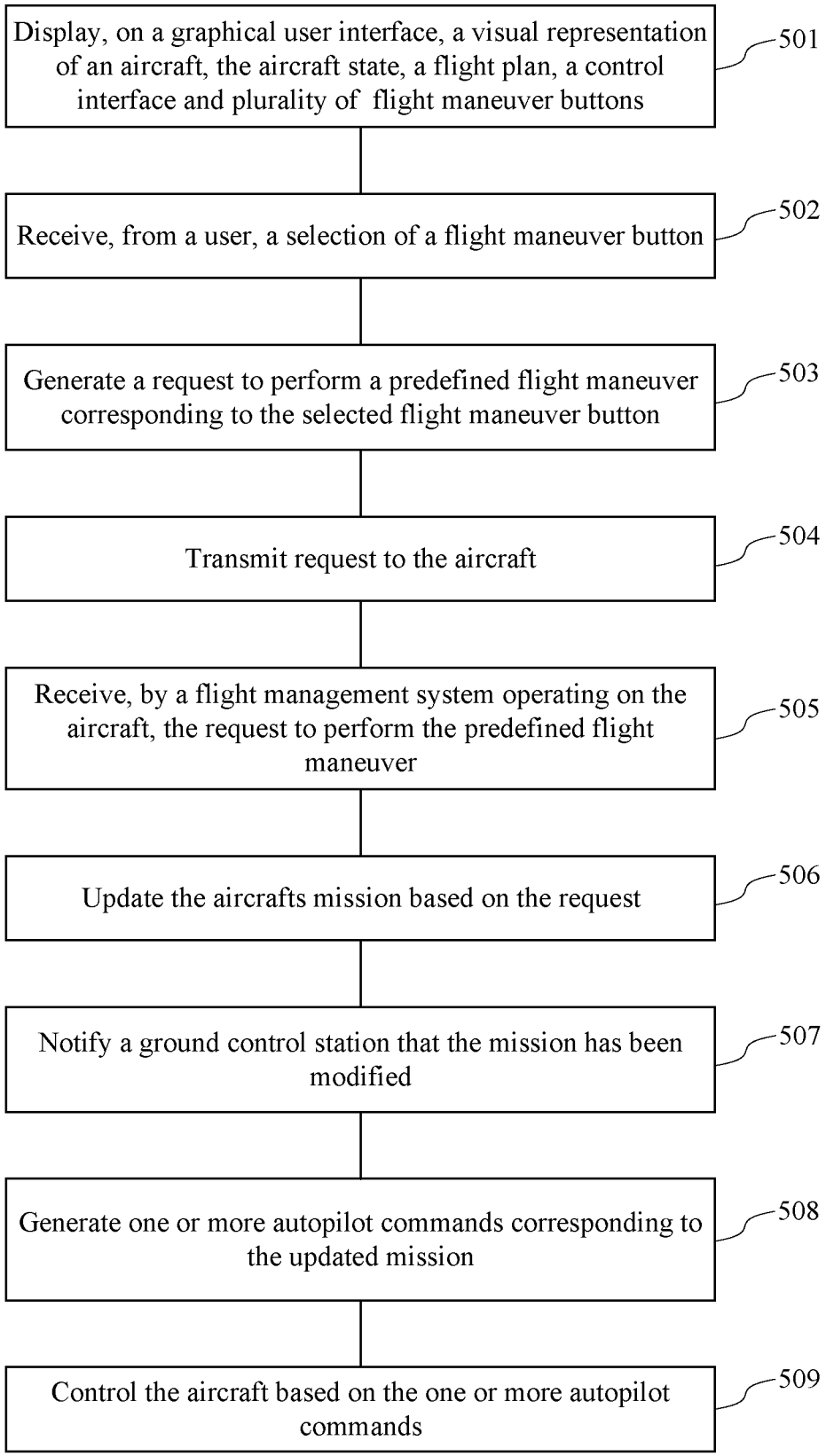
FIG. 5A is a flow chart illustrating an exemplary method that may be performed in accordance with some embodiments.

FIG. 5A is a flow chart illustrating an exemplary method 500 that may be performed in accordance with some embodiments.

At step 501, the system may Display, on a graphical user interface, a visual representation of an aircraft, the aircraft state, a flight plan, a control interface and plurality of flight maneuver buttons.

At step 502, the system may receive, from a user, a selection of a flight maneuver button.

At step 503, the system may generate a request to perform a predefined flight maneuver corresponding to the selected flight maneuver button.

At step 504, the system may transmit the request to the aircraft.

At step 505, the system may receive, by a flight management system operating on the aircraft, the request to perform the predefined flight maneuver.

At step 506, the system may update the aircrafts mission based on the request.

At step 507, the system may notify a ground control station that the mission has been modified.

At step 508, the system may generate one or more autopilot commands corresponding to the updated mission.

At step 509, the system may control the aircraft based on the one or more autopilot commands.

Figure 5B:
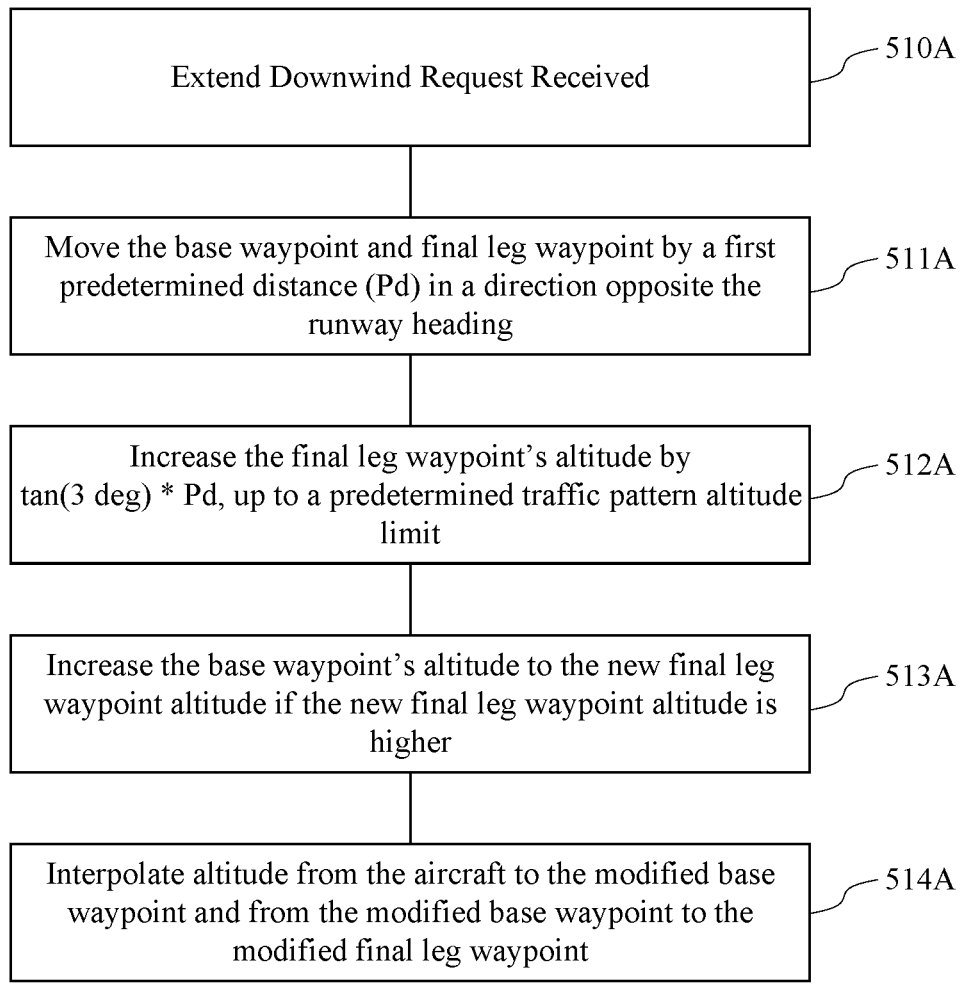
FIG. 5B is a flow chart illustrating an exemplary method that may be performed in accordance with some embodiments.

FIG. 5B is a flow chart illustrating an exemplary method 506A that may be performed in accordance with some embodiments.

At step 510A, the system may receive an extend downwind request.

At step 511A, the system may move the base waypoint and final leg waypoint by a first predetermined distance (Pd) in a direction opposite the runway heading.

At step 512A, the system may increase the final leg waypoint's altitude by tan(3 deg)*Pd, up to a predetermined traffic pattern altitude limit.

At step 513A, the system may increase the base waypoint's altitude to the new final leg waypoint altitude if the new final leg waypoint altitude is higher.

At step 514A, the system may interpolate altitude from the aircraft to the modified base waypoint and from the modified base waypoint to the modified final leg waypoint.

Figure 5C:
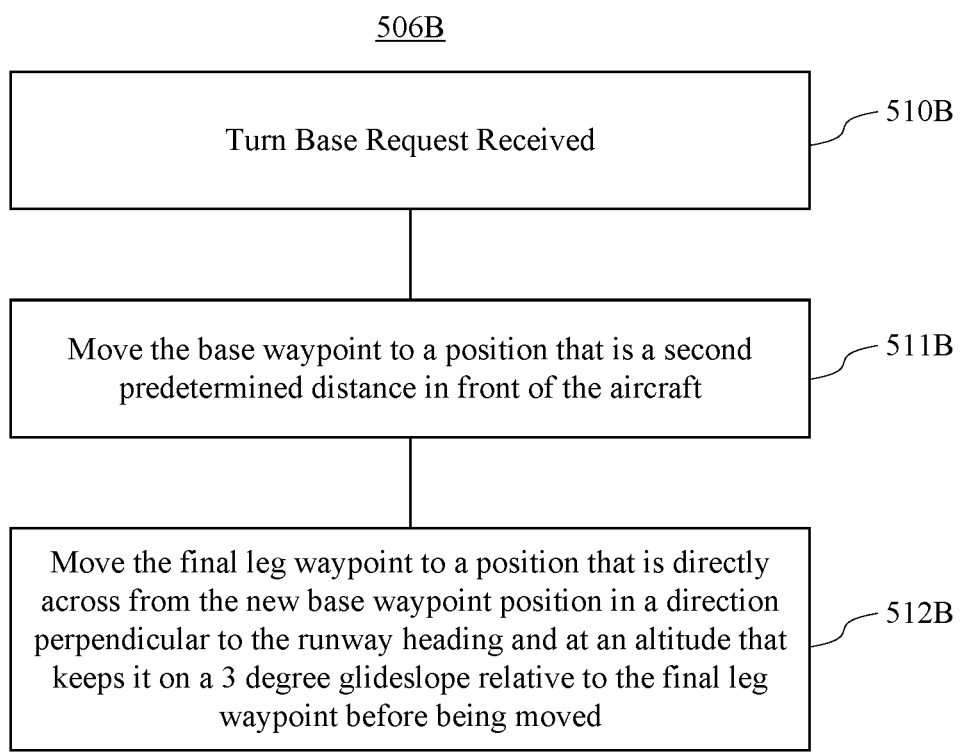
FIG. 5C is a flow chart illustrating an exemplary method that may be performed in accordance with some embodiments.

FIG. 5C is a flow chart illustrating an exemplary method 506B that may be performed in accordance with some embodiments.

At step 510B, the system may receive a turn base request.

At step 511B, the system may move the base waypoint to a position that is a second predetermined distance in front of the aircraft.

At step 512B, the system may move the final leg waypoint to a position that is directly across from the new base waypoint position in a direction perpendicular to the runway heading and at an altitude that keeps it on a 3 degree glideslope relative to the final leg waypoint before being moved.

Figure 5D:
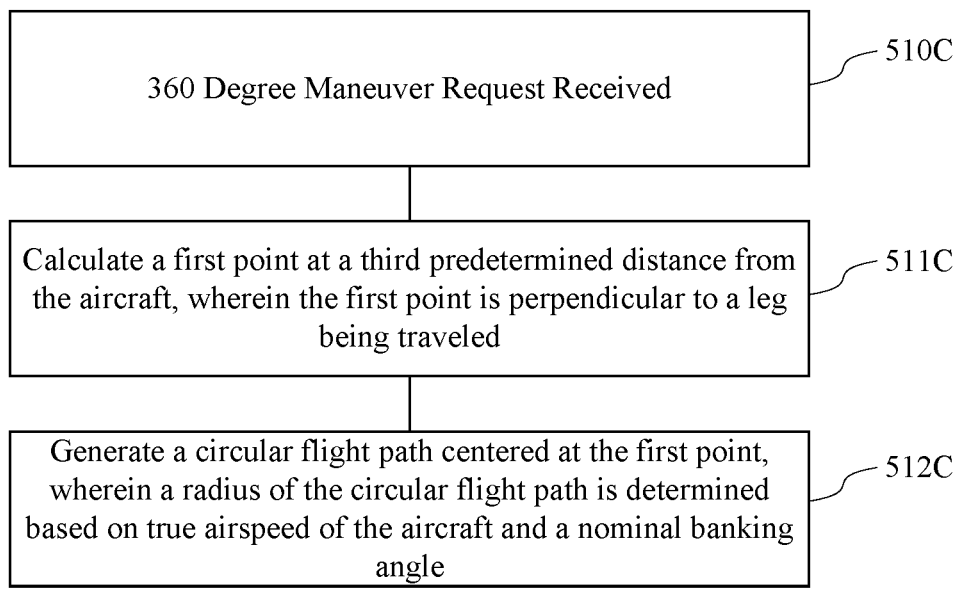
FIG. 5D is a flow chart illustrating an exemplary method that may be performed in accordance with some embodiments.

FIG. 5D is a flow chart illustrating an exemplary method 506C that may be performed in accordance with some embodiments.

At step 510C, the system may receive a 360 degree maneuver request.

At step 511C, the system may calculate a first point at a third predetermined distance from the aircraft, wherein the first point is perpendicular to a leg being traveled.

At step 512C, the system may generate a circular flight path centered at the first point, wherein a radius of the circular flight path is determined based on true airspeed of the aircraft and a nominal banking angle.

Figure 6:
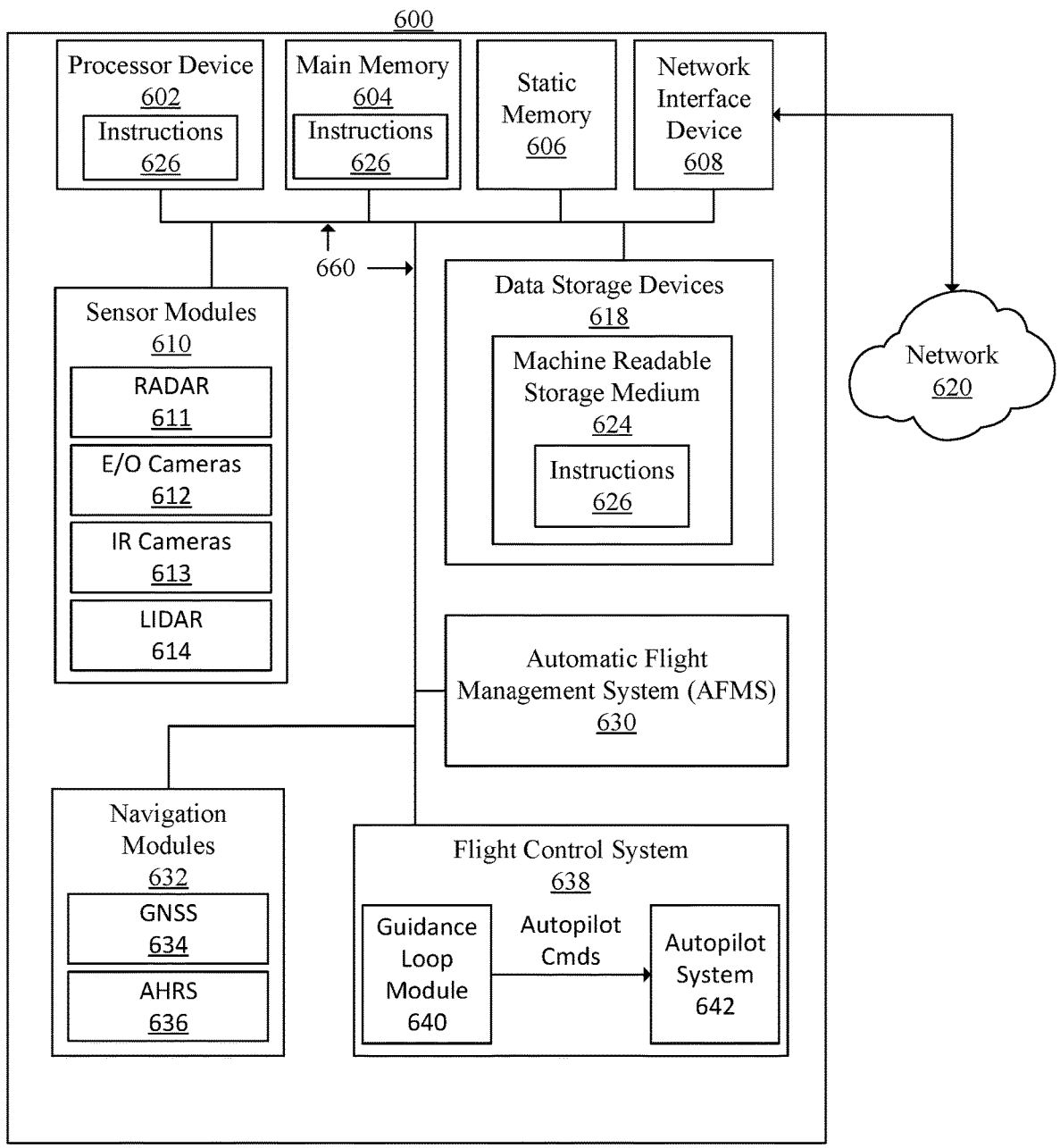
FIG. 6 is a diagram illustrating an exemplary computer/control system that may perform processing in some embodiments and in accordance with aspects of the present disclosure.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, an ad-hoc network, a mesh network, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 660.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 608 to communicate over the network 620. The computer system 600 also may include sensor modules 610, automatic flight management system (AFMS) 630, navigation modules 632, flight control system 638. Sensor modules 610 may include RADAR 611, E/O cameras 612, IR cameras 613 and LIDAR 614. Sensor modules 610 may be the same or similar to that of sensor modules 218 in FIG. 2A. AFMS 630 may be the same or similar to that of AFMS 200 in FIG. 2A-B. Navigation modules 632 may include GNSS 634 and AHRS 636. Navigation modules 632 may be the same or similar to that of navigation modules 212 in FIG. 2A. Flight control system 638 may include guidance loop module 640 and autopilot system 642. Flight control system 638, guidance loop module 640, and autopilot system 642 may be the same or similar to that of flight control system 202, guidance loop module 204, and autopilot system 206 in FIG. 2A.

The data storage device 618 may include a machine-readable storage medium 624 (also known as a computer-readable medium) on which is stored one or more sets of instructions or software 626 embodying any one or more of the methodologies or functions described herein. The instructions 626 may also reside, completely or at least partially, within the main memory 604 and/or within the processing device 602 during execution thereof by the computer system 600, the main memory 604 and the processing device 602 also constituting machine-readable storage media. Information, including data used in the processes and methods of the system and the one or more sets of instructions or software, may also be stored in blockchain, as NFTs or other decentralized technologies.

In one implementation, the instructions 626 include instructions to implement functionality corresponding to the components of a device to perform the disclosure herein. While the machine-readable storage medium 624 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. An aircraft landing pattern control system configured to allow a user to modify a landing pattern of an aircraft through a graphical user interface, the aircraft landing pattern control system comprising:
   a user interface module configured to display a graphical user interface on an operator device, wherein the graphical user interface is configured to control an aircraft during a mission while in mission mode, and wherein the graphical user interface comprises:
      a visual representation of the aircraft;
      one or more waypoints, wherein the one or more waypoints include an initial descent waypoint, a base waypoint, a final leg waypoint, and a landing waypoint;
      one or more flight legs, wherein the one or more flight legs include a downwind leg, a base leg, and a final leg, wherein the final leg is on a runway heading;
      one or more elements configured to display a current state of the aircraft;
      one or more elements configured to receive set point data from a user and transmit requests to the aircraft corresponding to the received set point data; and
      one or more flight maneuver buttons, wherein each of the one or more flight maneuver buttons corresponds to a predefined flight maneuver, and wherein a selection, by the user, of a first flight maneuver button triggers a request, transmitted to the aircraft, to perform a first predefined flight maneuver comprising a downwind extension flight maneuver; and
   a flight management system, operating on the aircraft, configured to:
      receive a first requests from the user interface module;
      update the mission based on the received first request;
      notify a ground control station that the mission has been modified;
      generate one or more autopilot commands corresponding to the updated mission; and
      control the aircraft based on the one or more autopilot commands.

2. The aircraft landing pattern control system of claim 1, wherein the received first request corresponds to a request to perform the first predefined flight maneuver, and wherein updating of the mission is based on the first predefined flight maneuver.

3. The aircraft landing pattern control system of claim 2, wherein the user interface module is further configured to:
   modify the first flight maneuver button to visually indicate a selection and a number of times a first flight maneuver has been performed by the aircraft;
   move the base waypoint and final leg waypoint to updated positions based on the updated mission; and
   redraw the downwind leg, base leg, and final leg based on the updated positions of the base waypoint and final leg waypoint.

4. The aircraft landing pattern control system of claim 3, wherein the updating of the mission comprises:
   modifying the base waypoint and the final leg waypoint, wherein the modifying comprises:
      moving the base waypoint and final leg waypoint by a first predetermined distance (Pd) in a direction opposite the runway heading;
      increasing the final leg waypoint's altitude by the equation tangent (3 degrees)*Pd, up to a predetermined traffic pattern altitude limit, to generate a new final leg waypoint altitude; and
      increasing the base waypoint's altitude to the new final leg waypoint altitude if the new final leg waypoint altitude is higher; and
   interpolating altitude from the aircraft to the modified base waypoint and from the modified base waypoint to the modified final leg waypoint.

5. The aircraft landing pattern control system of claim 2, wherein a second flight maneuver button selection corresponds to a turn-base maneuver; and
   wherein the user interface module is further configured to:
      modify the second flight maneuver button to visually indicate a selection by the user;
      move the base waypoint and final leg waypoint to updated positions based on the updated mission; and
      redraw the downwind leg, base leg, and final leg based on the updated positions of the base waypoint and final leg waypoint.

6. The aircraft landing pattern control system of claim 5, wherein the updating of the mission comprises:
   modifying the base waypoint and the final leg waypoint, wherein the modifying comprises:
      moving the base waypoint to a position that is a second predetermined distance in front of the aircraft, to generate a new base waypoint position; and moving the final leg waypoint to a position that is directly across from the new base waypoint position in a direction perpendicular to the runway heading and at an altitude that keeps it on a 3 degree glideslope relative to the final leg waypoint before being moved.

7. The aircraft landing pattern control system of claim 2, wherein a second flight maneuver button selection corresponds to a 360 degree maneuver; and
wherein the user interface module is further configured to:
modify the second flight maneuver button to visually indicate a selection by the user;
display a button configured to generate a request to cancel the 360 degree maneuver; and
display a circular flight path corresponding to the 360 degree maneuver.

8. The aircraft landing pattern control system of claim 7, wherein the updating of the mission comprises:
calculating a first point at a third predetermined distance from the aircraft, wherein the first point is perpendicular to a leg being traveled; and
generating a circular flight path centered at the first point, wherein a radius of the circular flight path is determined based on true airspeed of the aircraft and a nominal banking angle.

9. The aircraft landing pattern control system of claim 8, wherein the updating of the mission comprises adjusting the flight path to perform a climb during the 360 degree maneuver.

10. The aircraft landing pattern control system of claim 8, wherein the updating of the mission comprises adjusting the flight path to descend a predetermined amount during the 360 degree maneuver.

11. A computer implemented method for modifying a landing pattern of an aircraft through a graphical user interface, the method comprising:
displaying, by a user interface module, a graphical user interface on an operator device;
controlling, by the graphical user interface, an aircraft during a mission and while in mission mode, wherein the graphical user interface comprises:
a visual representation of the aircraft;
one or more waypoints, wherein the one or more waypoints include an initial descent waypoint, a base waypoint, a final leg waypoint, and a landing waypoint;
one or more flight legs, wherein the one or more flight legs include a downwind leg, a base leg, and a final leg, wherein the final leg is on a runway heading;
one or more elements configured to display a current state of the aircraft;
one or more elements configured to receive set point data from a user and transmit requests to the aircraft corresponding to the received set point data; and
one or more flight maneuver buttons, wherein each of the one or more flight maneuver buttons corresponds to a predefined flight maneuver, and wherein a selection, by the user, of a first flight maneuver button triggers a request, transmitted to the aircraft, to perform a first predefined flight maneuver comprising a downwind extension flight maneuver;
receiving, by a flight management system operating on the aircraft, a first requests from the user interface module;
updating the mission based on the received first request;
notifying a ground control station that the mission has been modified;
generating one or more autopilot commands corresponding to the updated mission; and
controlling the aircraft based on the one or more autopilot commands.

12. The method of claim 11, wherein the received first request corresponds to a request to perform the first predefined flight maneuver, and wherein updating of the mission is based on the first predefined flight maneuver.

13. The method of claim 12, wherein the user interface module is further configured to:
modify the first flight maneuver button to visually indicate a selection and a number of times a first flight maneuver has been performed by the aircraft;
move the base waypoint and final leg waypoint to updated positions based on the updated mission; and
redraw the downwind leg, base leg, and final leg based on the updated positions of the base waypoint and final leg waypoint.

14. The method of claim 13, wherein the updating of the mission comprises:
modifying the base waypoint and the final leg waypoint, wherein the modifying comprises:
moving the base waypoint and final leg waypoint by a first predetermined distance (Pd) in a direction opposite the runway heading;
increasing the final leg waypoint's altitude by the equation tangent (3 degrees)*Pd, up to a predetermined traffic pattern altitude limit, to generate a new final leg waypoint altitude; and
increasing the base waypoint's altitude to the new final leg waypoint altitude if the new final leg waypoint altitude is higher; and
interpolating altitude from the aircraft to the modified base waypoint and from the modified base waypoint to the modified final leg waypoint.

15. The method of claim 12, wherein a second flight maneuver button selection corresponds to a turn-base maneuver; and
wherein the user interface module is further configured to:
modify the second flight maneuver button to visually indicate a selection by the user;
move the base waypoint and final leg waypoint to updated positions based on the updated mission; and
redraw the downwind leg, base leg, and final leg based on the updated positions of the base waypoint and final leg waypoint.

16. The method of claim 15, wherein the updating of the mission comprises:
modifying the base waypoint and the final leg waypoint, wherein the modifying comprises:
moving the base waypoint to a position that is a second predetermined distance in front of the aircraft, to generate a new base waypoint position; and
moving the final leg waypoint to a position that is directly across from the new base waypoint position in a direction perpendicular to the runway heading and at an altitude that keeps it on a 3 degree glideslope relative to the final leg waypoint before being moved.

17. The method of claim 12, wherein a second flight maneuver button selection corresponds to a 360 degree maneuver; and
wherein the user interface module is further configured to:
modify the second flight maneuver button to visually indicate a selection by the user;
display a button configured to generate a request to cancel the 360 degree maneuver; and display a circular flight path corresponding to the 360 degree maneuver.

18. The method of claim 17, wherein the updating of the mission comprises:
   calculating a first point at a third predetermined distance from the aircraft, wherein the first point is perpendicular to a leg being traveled; and
   generate a circular flight path centered at the first point, wherein a radius of the circular flight path is determined based on true airspeed of the aircraft and a nominal banking angle.

19. The method of claim 18, wherein the updating of the mission comprises adjusting the flight path to perform a climb during the 360 degree maneuver.

20. The method of claim 18, wherein the updating of the mission comprises adjusting the flight path to descend a predetermined amount during the 360 degree maneuver.

* * * * *